US012782683B2

United States Patent
(12) United States Patent
Wang

(10) Patent No.: US 12,782,683 B2
(45) Date of Patent: Nov. 3, 2026

(54) LENS ASSEMBLY COMPRISING FOUR LENSES

(71) Applicants: Sintai Optical (Shenzhen) Co., Ltd., ShenZhen City (CN); Asia Optical Co., Inc., Taichung (TW)

(72) Inventor: Li-Kai Wang, Taichung (TW)

(73) Assignees: SINTAI OPTICAL (SHENZHEN) CO., LTD., Shenzhen City (CN); ASIA OPTICAL CO., INC., Taichung (TW)

( * ) Notice: Subject to any disclaimer, the term of this patent is extended or adjusted under 35 U.S.C. 154(b) by 235 days.

(21) Appl. No.: 18/668,601

(22) Filed: May 20, 2024

(65) Prior Publication Data

US 2024/0418963 A1 Dec. 19, 2024

(30) Foreign Application Priority Data

Jun. 19, 2023 (CN) ......................... 202310720231.9

(51) Int. Cl.

*G02B 13/00* (2006.01)
*G02B 9/12* (2006.01)
*G02B 9/34* (2006.01)

(52) U.S. Cl.

CPC ........... *G02B 13/0035* (2013.01); *G02B 9/12* (2013.01); *G02B 9/34* (2013.01); *G02B 13/004* (2013.01)

(58) Field of Classification Search

None

See application file for complete search history.

(56) References Cited

U.S. PATENT DOCUMENTS

| | | | |
|---|---|---|---|
| 9,341,815 B1 | 5/2016 | Hsueh et al. | |
| 9,759,889 B1 * | 9/2017 | Tang | G02B 7/021 |
| 2007/0229988 A1 | 10/2007 | Sato et al. | |
| 2008/0297925 A1 * | 12/2008 | Chen | H10F 39/804 348/E5.022 |

FOREIGN PATENT DOCUMENTS

| | | |
|---|---|---|
| CN | 203519917 U | 4/2014 |
| CN | 115166936 A | 10/2022 |
| TW | 201516457 A | 5/2015 |
| TW | 201525521 A | 7/2015 |
| TW | 201626035 A | 7/2016 |
| TW | 202136842 A | 10/2021 |

* cited by examiner

*Primary Examiner* — Paul C Lee

(74) *Attorney, Agent, or Firm* — McClure, Qualey & Rodack, LLP

(57) ABSTRACT

A lens assembly includes a first lens, a second lens, and a third lens. The first lens is with refractive power. The second lens is with refractive power. The third lens is with negative refractive power and includes a concave surface facing an image side. The first lens, the second lens, and the third lens are arranged in order from an object side to the image side along an optical axis.

16 Claims, 17 Drawing Sheets

3

LENS ASSEMBLY COMPRISING FOUR LENSES

BACKGROUND OF THE INVENTION

Field of the Invention

The present invention relates to a lens assembly.

Description of the Related Art

The current development trend of a lens assembly used in automobile safety monitoring is constantly moving toward high resolution. However, the known lens assembly no longer satisfies the requirements for today's automobile safety monitoring. Therefore, the lens assembly needs a new structure in order to meet the requirement of high resolution.

BRIEF SUMMARY OF THE INVENTION

The invention provides a lens assembly to solve the above problems. The lens assembly of the invention is provided with characteristics of an increased resolution and still has a good optical performance.

The lens assembly in accordance with an exemplary embodiment of the invention includes a first lens, a second lens, and a third lens. The first lens is with refractive power. The second lens is with refractive power. The third lens is with negative refractive power and includes a concave surface facing an image side. The first lens, the second lens, and the third lens are arranged in order from an object side to the image side along an optical axis. The lens assembly satisfies at least one of the following conditions: $-12.68\ \text{mm} \leq R32-(f1+f3) \leq -8.16\ \text{mm}$; $2.47 \leq (f1+f2)/f \leq 2.99$; $3.48 \leq TTL/(CT2+Air2) \leq 3.88$; wherein f is an effective focal length of the lens assembly, f1 is an effective focal length of the first lens, f2 is an effective focal length of the second lens, f3 is an effective focal length of the third lens, R32 is a radius of curvature of an image side surface of the third lens, TTL is an interval from an object side surface of a lens closest to the object side to an image plane along the optical axis, CT2 is an interval from an object side surface of the second lens to an image side surface of the second lens along the optical axis, and Air2 is an air interval from the image side surface of the second lens to an object side surface of the third lens along the optical axis.

In another exemplary embodiment, the first lens is with positive refractive; and the second lens is with positive refractive power.

In yet another exemplary embodiment, the first lens is a meniscus lens and includes a convex surface facing the object side and a concave surface facing the image side; and the second lens is a meniscus lens and includes a concave surface facing the object side and a convex surface facing the image side.

In another exemplary embodiment, the third lens is a meniscus lens and further includes a convex surface facing the object side.

In yet another exemplary embodiment, the lens assembly further includes an optical filter disposed between the third lens and the image side and satisfies at least one of the following conditions: $0.2\ \text{mm} \leq (R12/R32) \times Air3 \leq 14.9\ \text{mm}$; $3.03\ \text{mm}^2 \leq R21 \times (f3/Nd1) \leq 27.41\ \text{mm}^2$; $1.72 \leq (R21 \times R22)^{0.5}/Air3 \leq 9.25$; $5\ \text{mm} \leq (f1 \times (f2+f3))/R21 \leq 32\ \text{mm}$; $11.01 \leq R12/CT1 \leq 18.51$; $5 \leq (R12+R21+R22)/CT3 \leq 14.1$; $-20.64\ \text{mm} \leq f3/(Vd2/Vd3) \leq -1.29\ \text{mm}$; $0.6 \leq (f2/R11)^{0.5} < 4.2$; $0.58\ \text{mm} \leq f2/(CT3/Air3) \leq 5.65\ \text{mm}$; $0.57 \leq (Air1+Air2)/BFL \leq 0.88$; $3.09 \leq f/Air1 \leq 4.71$; wherein f is the effective focal length of the lens assembly, f1 is the effective focal length of the first lens, f2 is the effective focal length of the second lens, f3 is the effective focal length of the third lens, R11 is a radius of curvature of an object side surface of the first lens, R12 is a radius of curvature of an image side surface of the first lens, R21 is a radius of curvature of the object side surface of the second lens, R22 is a radius of curvature of the image side surface of the second lens, R32 is the radius of curvature of the image side surface of the third lens, BFL is an interval from the image side surface of the third lens to the image plane along the optical axis, CT1 is an interval from the object side surface of the first lens to the image side surface of the first lens along the optical axis, CT3 is an interval from the object side surface of the third lens to the image side surface of the third lens along the optical axis, Air1 is an air interval from the image side surface of the first lens to the object side surface of the second lens along the optical axis, Air2 is the air interval from the image side surface of the second lens to the object side surface of the third lens along the optical axis, Air3 is an air interval from the image side surface of the third lens to an object side surface of the optical filter along the optical axis, Vd2 is an Abbe number of the second lens, Vd3 is an Abbe number of the third lens, and Nd1 is a refractive index of the first lens.

In another exemplary embodiment, the lens assembly further includes a stop and a fourth lens, wherein the stop is disposed between the object side and the first lens and the fourth lens is disposed between the object side and the stop.

In yet another exemplary embodiment, the fourth lens is a biconvex lens with positive refractive power and includes a convex surface facing the object side and another convex surface facing the image side.

In another exemplary embodiment, the third lens is a biconcave lens and further includes another concave surface facing the object side.

In yet another exemplary embodiment, the lens assembly further includes a stop disposed between the object side and the first lens.

In another exemplary embodiment, the first lens is a spherical lens and made of glass material.

In yet another exemplary embodiment, the second lens, the third lens, and the fourth lens are aspheric lenses and made of plastic material.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
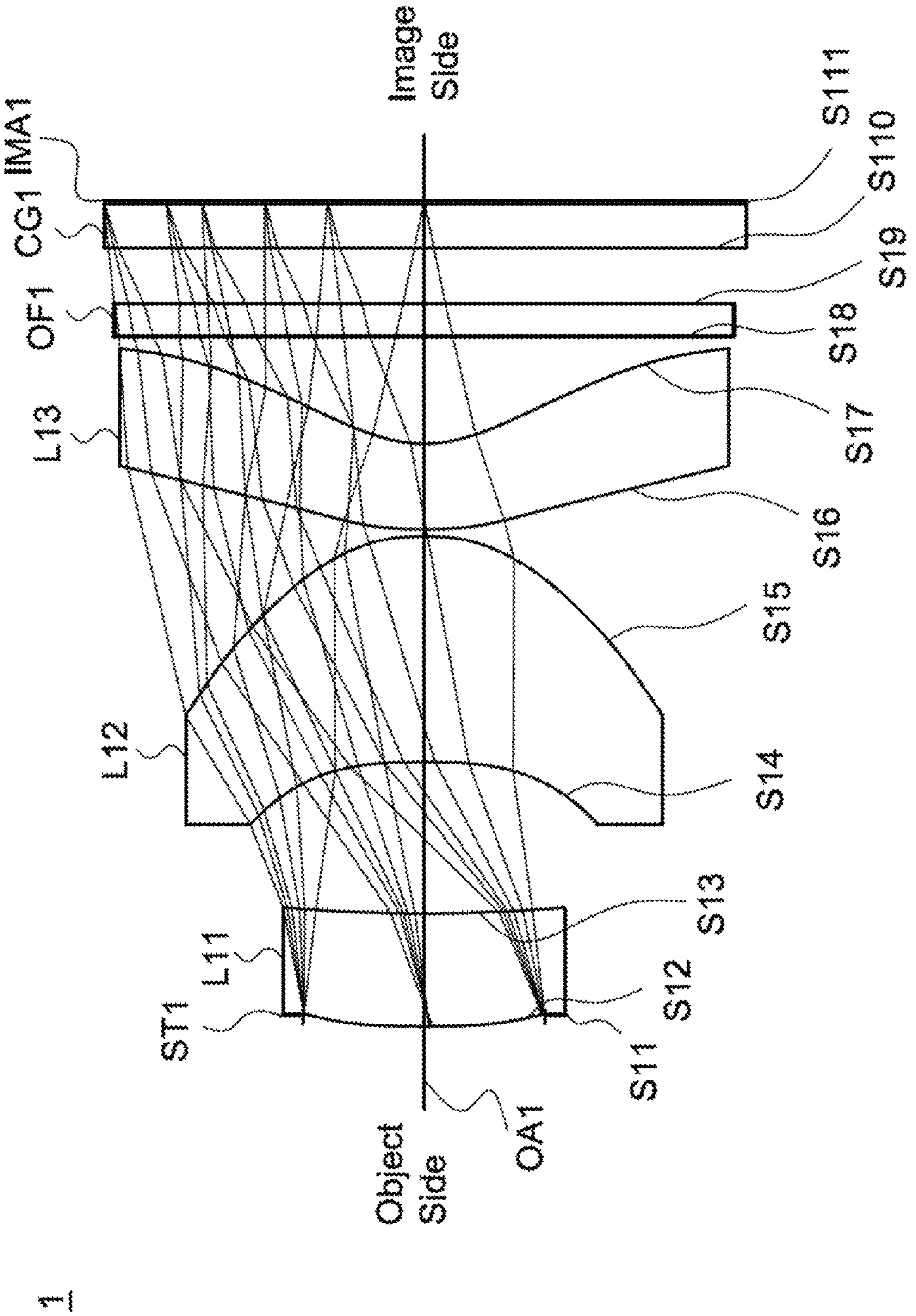
FIG. 1 is a lens layout and optical path diagram of a lens assembly in accordance with a first embodiment of the invention.
Figure 2:
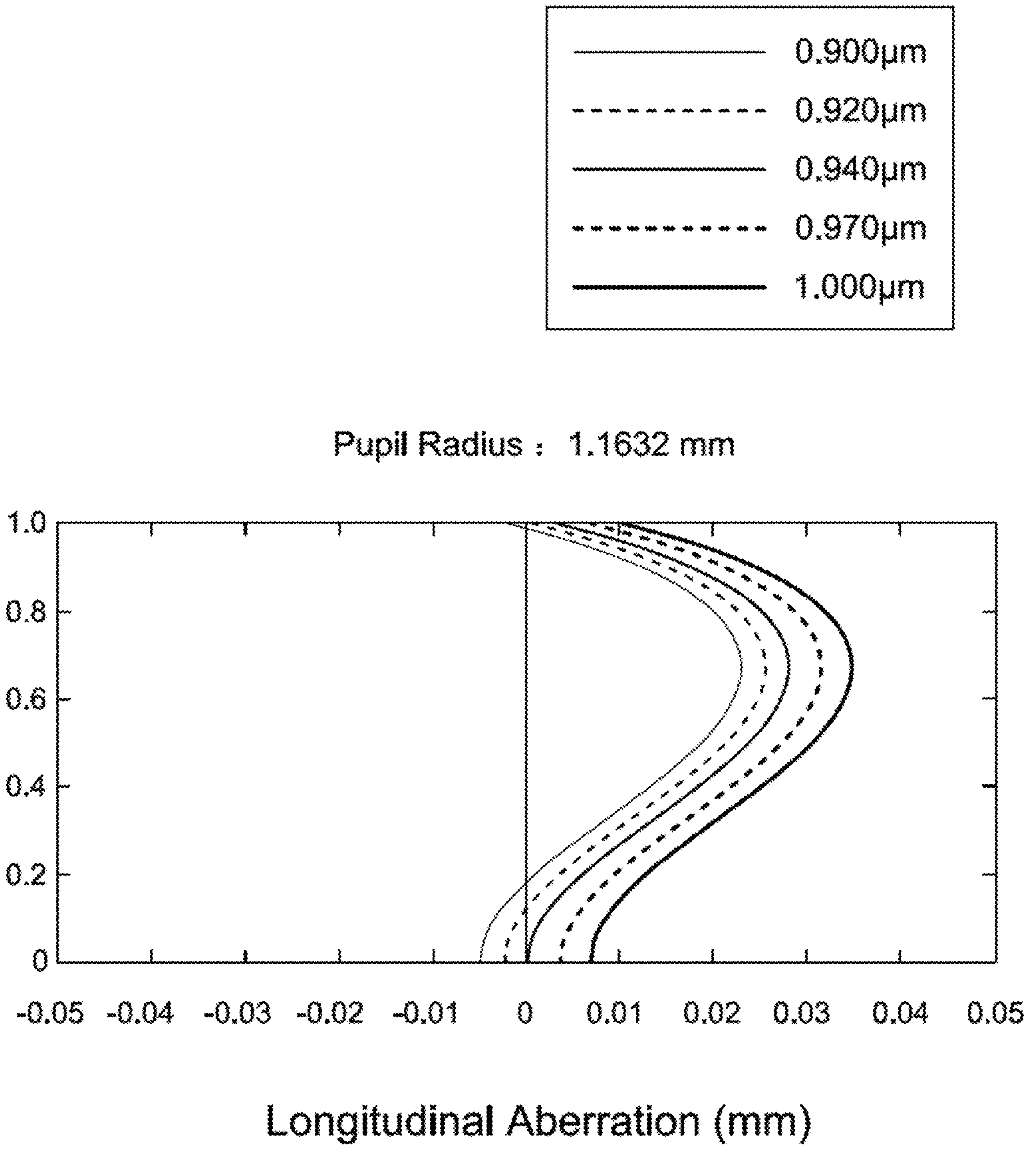
FIGS. 2, 3, 4, 5 depict a longitudinal aberration diagram, a field curvature diagram, a distortion diagram, and a relative illumination diagram of the lens assembly in accordance with the first embodiment of the invention, respectively.
Figure 3:
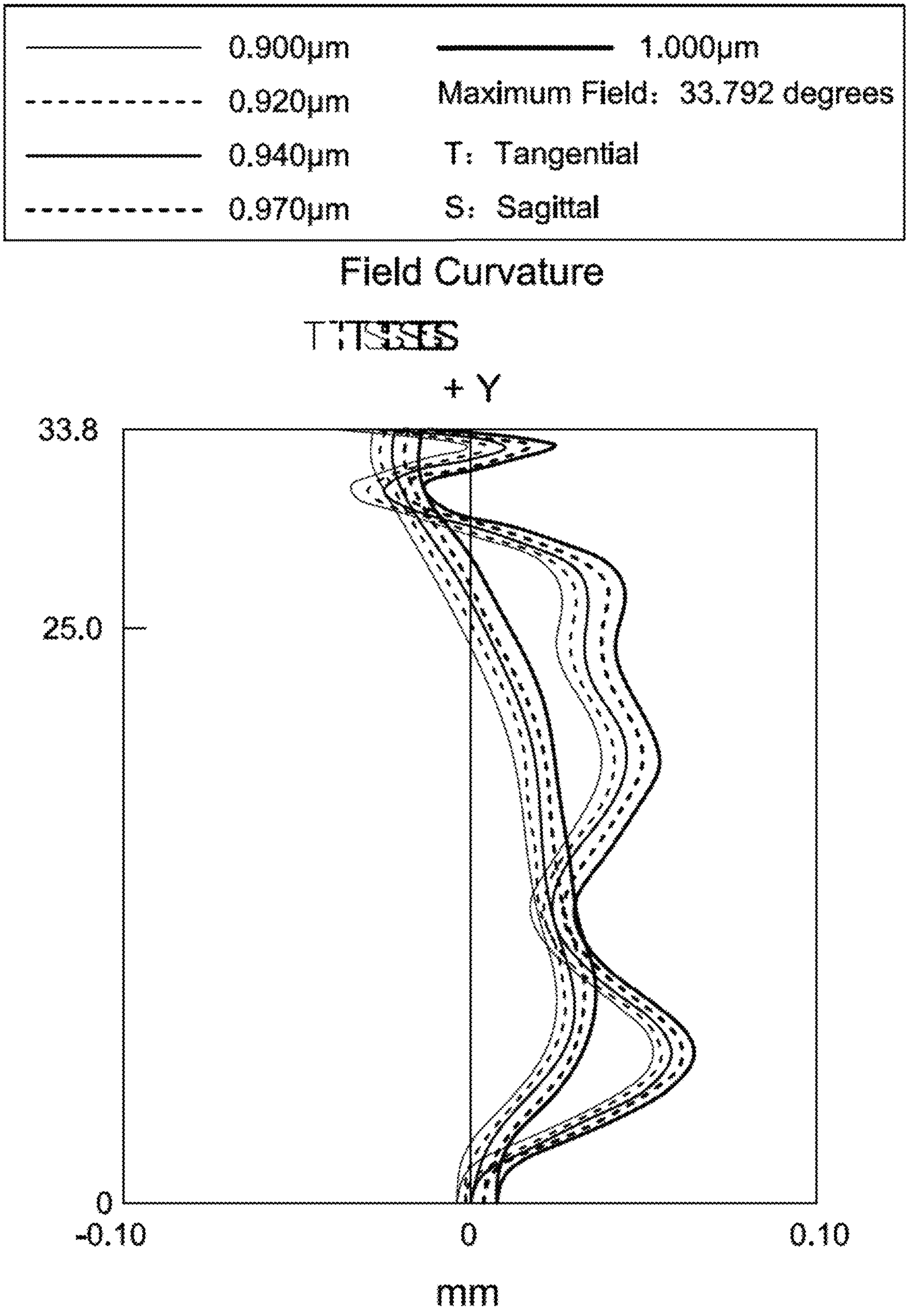
Figure 4:
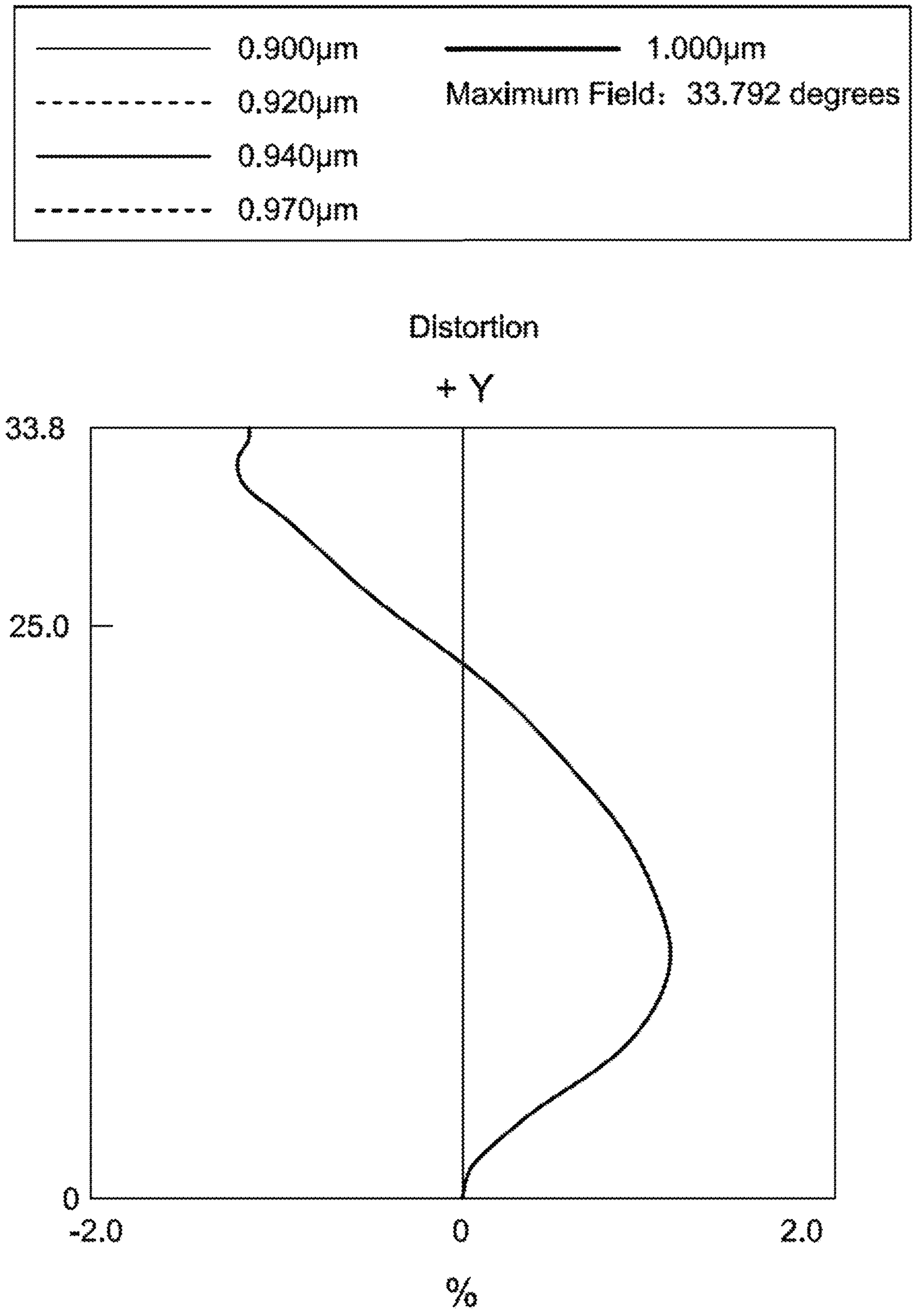
Figure 5:
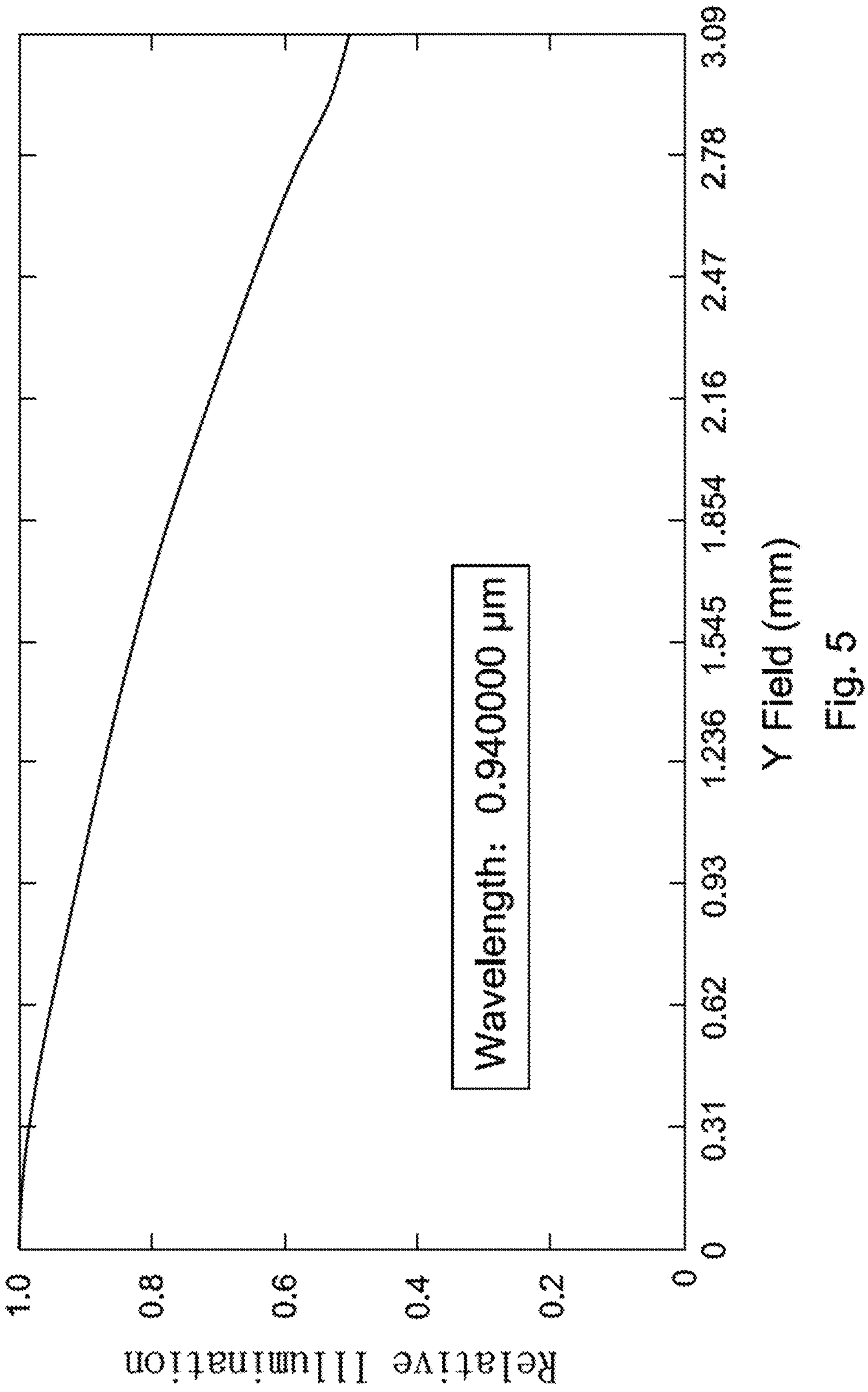

The following description is made for the purpose of illustrating the general principles of the invention and should not be taken in a limiting sense. The scope of the invention is best determined by reference to the appended claims.

The present invention provides a lens assembly including a first lens, a second lens, and a third lens. The first lens is with refractive power. The second lens is with refractive power. The third lens is with negative refractive power and includes a concave surface facing an image side. The first lens, the second lens, and the third lens are arranged in order from an object side to the image side along an optical axis. The lens assembly satisfies at least one of the following conditions: $-12.68\text{ mm} \le R32-(f1+f3) \le -8.16\text{ mm}$; $2.47 \le (f1+f2)/f \le 2.99$; $3.48 \le TTL/(CT2+Air2) \le 3.88$; wherein f is an effective focal length of the lens assembly, f1 is an effective focal length of the first lens, f2 is an effective focal length of the second lens, f3 is an effective focal length of the third lens, R32 is a radius of curvature of an image side surface of the third lens, TTL is an interval from an object side surface of a lens closest to the object side to an image plane along the optical axis, CT2 is an interval from an object side surface of the second lens to an image side surface of the second lens along the optical axis, and Air2 is an air interval from the image side surface of the second lens to an object side surface of the third lens along the optical axis. A lens assembly of the present invention is a preferred embodiment of the present invention when the lens assembly satisfies the above features and at least one of the above conditions.

Referring to Table 1, Table 2, Table 4, Table 5, Table 7, Table 8, Table 10, Table 11, Table 13, and Table 14, wherein Table 1, Table 4, Table 7, Table 10, and Table 13 show optical specification in accordance with a first, second, third, fourth, and fifth embodiments of the invention, respectively, and Table 2, Table 5, Table 8, Table 11, and Table 14 show aspheric coefficients of each aspheric lens in Table 1, Table 4, Table 7, Table 10, and Table 13, respectively. The aspheric surface sag z of each aspheric lens in the following embodiments can be calculated by the following formula: $z=ch^2/\{1+[1-(k+1)c^2h^2]^{1/2}\}+Ah^4+Bh^6+Ch^8+Dh^{10}+Eh^{12}+Fh^{14}+Gh^{16}$, where c is curvature, h is the vertical distance from the lens surface to the optical axis, k is conic constant, A, B, C, D, E, F, and G are aspheric coefficients, and the value of the aspheric coefficient A, B, C, D, E, F, and G are presented in scientific notation, such as 2E-03 for $2\times10^{-3}$.

FIGS. 1, 6, 7, 12, 17 are lens layout and optical path diagrams of the lens assemblies in accordance with the first, second, third, fourth, and fifth embodiments of the invention, respectively.

The first lenses L11, L21, L31, L41, L51 are meniscus lenses with positive refractive power and made of glass material, wherein the object side surfaces S12, S22, S32, S42, S54 are convex surfaces, the image side surfaces S13, S23, S33, S43, S55 are concave surfaces, and both of the object side surfaces S12, S22, S32, S42, S54 and image side surfaces S13, S23, S33, S43, S55 are spherical surfaces.

The second lenses L12, L22, L32, L42, L52 are meniscus lens with positive refractive power and made of plastic material, wherein the object side surfaces S14, S24, S34, S44, S56 are concave surfaces, the image side surfaces S15, S25, S35, S45, S57 are convex surfaces, and both of the object side surfaces S14, S24, S34, S44, S56 and image side surfaces S15, S25, S35, S45, S57 are aspheric surfaces.

The third lenses L13, L23, L33, L43, L53 are with negative refractive power and made of plastic material, wherein the image side surfaces S17, S27, S37, S47, S59 are concave surfaces and both of the object side surfaces S16, S26, S36, S46, S58 and image side surfaces S17, S27, S37, S47, S59 are aspheric surfaces.

In addition, the lens assemblies 1, 2, 3, 4, and 5 satisfy at least one of the following conditions (1)-(14):

$$0.2\text{ mm} \le (R12/R32)\times \text{Air3} \le 14.9\text{ mm}; \quad (1)$$

$$-12.68\text{ mm} \le R32-(f1+f3) \le -8.16\text{ mm}; \quad (2)$$

$$3.03\text{ mm}^2 \le R21\times(f3/Nd1) \le 27.41\text{ mm}^2; \quad (3)$$

$$1.72 \le (R21\times R22)^{0.5}/\text{Air3} \le 9.25; \quad (4)$$

$$5\text{ mm} \le (f1\times(f2+f3))/R21 \le 32\text{ mm}; \quad (5)$$

$$11.01 \le R12/CT1 \le 18.51; \quad (6)$$

$$5 \le (R12+R21+R22)/CT3 \le 14.1; \quad (7)$$

$$-20.64\text{ mm} \le f3/(Vd2/Vd3) \le -1.29\text{ mm}; \quad (8)$$

$$0.6 \le (f2/R11)^{0.5} \le 4.2; \quad (9)$$

$$0.58\text{ mm} \le f2/(CT3/\text{Air3}) \le 5.65\text{ mm}; \quad (10)$$

$$0.57 \le (\text{Air1}+\text{Air2})/BFL \le 0.88; \quad (11)$$

$$2.47 \le (f1+f2)/f \le 2.99; \quad (12)$$

$$3.09 \le f/\text{Air1} \le 4.71; \quad (13)$$

$$3.48 \le TTL/(CT2+\text{Air2}) \le 3.88; \quad (14)$$

wherein: f is an effective focal length of the lens assemblies 1, 2, 3, 4, 5 for the first to fifth embodiments; f1 is an effective focal length of the first lenses L11, L21, L31, L41, L51 for the first to fifth embodiments; f2 is an effective focal length of the second lenses L12, L22, L32, LA2, L52 for the first to fifth embodiments; f3 is an effective focal length of the third lenses L13, L23, L33, L43, L53 for the first to fifth embodiments; R11 is a radius of curvature of the object side surfaces S12, S22, S32, S42, S54 of the first lenses L11, L21, L31, L41, L51 for the first to fifth embodiments; R12 is a radius of curvature of the image side surfaces S13, S23, S33, S43, S55 of the first lenses L11, L21, L31, L41, L51 for the first to fifth embodiments; R21 is a radius of curvature of the object side surfaces S14, S24, S34, S44, S56 of the second lenses L12, L22, L32, L42, L52 for the first to fifth embodiments; R22 is a radius of curvature of the image side surfaces S15, S25, S35, S45, S57 of the second lenses L12, L22, L32, L42, L52 for the first to fifth embodiments; R32 is a radius of curvature of the image side surfaces S17, S27, S37, S47, S59 of the third lenses L13, L23, L33, L43, L53 for the first to fifth embodiments; CT1 is an interval from the object side surfaces S12, S22, S32, S42, S54 of the first lenses L11, L21, L31, L41, L51 to the image side surfaces S13, S23, S33, S43, S55 of the first lenses L11, L21, L31, L41, L51 along the optical axes OA1, OA2, OA3, OA4, OA5 for the first to fifth embodiments; CT2 is an interval from the object side surfaces S14, S24, S34, S44, S56 of the second lenses L12, L22, L32, LA2, L52 to the image side surfaces S15, S25, S35, S45, S57 of the second lenses L12, L22, L32, L42, L52 along the optical axes OA1, OA2, OA3, OA4, OA5 for the first to fifth embodiments; CT3 is an interval from the object side surfaces S16, S26, S36, S46, S58 of the third lenses L13, L23, L33, L43, L53 to the image side surfaces S17, S27, S37, S47, S59 of the third lenses L13, L23, L33, L43, L53 along the optical axes OA1, OA2, OA3, OA4, OA5 for the first to fifth embodiments; TTL is an interval from the object side surfaces S11, S21, S31, S41, S51 of the lenses L11, L21, L31, L41, L54 closest to the object side to the image planes IMA1, IMA2, IMA3, IMA4, IMA5 along the optical axes OA1, OA2, OA3, OA4, OA5 for the first to fifth embodiments; BFL is an interval from the image side surfaces S17, S27, S37, S47, S59 of the third lenses L13, L23, L33, L43, L53 to the image planes IMA1, IMA2, IMA3, IMA4, IMA5 along the optical axes OA1, OA2, OA3, OA4, OA5 for the first to fifth embodiments; Air1 is an air interval from the image side surfaces S13, S23, S33, S43, S55 of the first lenses L11, L21, L31, L41, L51 to the object side surfaces S14, S24, S34, S44, S56 of the second lenses L12, L22, L32, L42, L52 along the optical axes OA1, OA2, OA3, OA4, OA5 for the first to fifth embodiments; Air2 is an air interval from the image side surfaces S15, S25, S35, S45, S57 of the second lenses L12, L22, L32, L42, L52 to the object side surfaces S16, S26, S36, S46, S58 of the third lenses L13, L23, L33, L43, L53 along the optical axes OA1, OA2, OA3, OA4, OA5 for the first to fifth embodiments; Air3 is an air interval from the image side surfaces S17, S27, S37, S47, S59 of the third lenses L13, L23, L33, L43, L53 to the object side surfaces S18, S28, S38, S48, S510 of the optical filters OF1, OF2, OF3, OF4, OF5 along the optical axes OA1, OA2, OA3, OA4, OA5 for the first to fifth embodiments; Nd1 is a refractive index of the first lenses L11, L21, L31, L41, L51 for the first to fifth embodiments; Vd2 is an Abbe number of the second lenses L12, L22, L32, L42, L52 for the first to fifth embodiments; and Vd3 is an Abbe number of the third lenses L13, L23, L33, L43, L53 for the first to fifth embodiments. With the lens assemblies 1, 2, 3, 4, 5 satisfying at least one of the above conditions (1)-(14), the resolution can be effectively increased and the aberration can be effectively corrected.

When the conditions (1): $0.2\ mm \le (R12/R32) \times Air3 \le 14.9\ mm$ and (2): $-12.68\ mm \le R32-(f1+f3) \le -8.16\ mm$ are satisfied or condition (3): $3.03\ mm^2 \le R21 \times (f3/Nd1) \le 27.41\ mm^2$ is satisfied, the resolution can be increased effectively and the aberration can be corrected effectively. When the condition (4): $1.72 \le (R21 \times R22)^{0.5}/Air3 \le 9.25$ is satisfied, the aberration can be corrected effectively by controlling the radius of curvature of the second lens and the air interval from the third lens to the optical filter. When the condition (5): $5\ mm \le (f1 \times (f2+f3))/R21 \le 32\ mm$ is satisfied, the off-axis aberration can be corrected effectively by controlling the effective focal length and thickness appropriate. When the condition (6): $11.01 \le R12/CT1 \le 18.51$ or condition (7): $5 \le (R12+R21+R22)/CT3 \le 14.1$ is satisfied, the off-axis aberration can be corrected effectively by controlling the effective focal length and thickness appropriate. When the condition (8): $-20.64\ mm \le f3/(Vd2/Vd3) \le -1.29\ mm$ is satisfied, the resolution can be increased effectively and the chromatic aberration can be corrected effectively. When the condition (9): $0.6 \le (f2/R11)^{0.5} \le 4.2$ is satisfied, the aberration can be effectively corrected by providing the lens with sufficient refractive power to control the field of view. When the condition (10): $0.58\ mm \le f2/(CT3/Air3) \le 5.65\ mm$ is satisfied, the resolution can be increased effectively and the aberration can be corrected effectively. When the conditions (11): $0.57 \le (Air1+Air2)/BFL \le 0.88$, (12): $2.47 \le (f1+f2)/f \le 2.99$, (13): $3.09 \le f/Air1 \le 4.71$ are satisfied or condition (14): $3.48 \le TTL/(CT2+Air2) \le 3.88$ is satisfied, the resolution can be increased effectively and the aberration can be corrected effectively. When the conditions (2): $-12.68\ mm \le R32-(f1+f3) \le -8.16\ mm$, (6): $11.01 \le R12/CT1 \le 18.51$, (11): $0.57 \le (Air1+Air2)/BFL \le 0.88$, (12): $2.47 \le (f1+f2)/f \le 2.99$, (14): $3.48 \le TTL/(CT2+Air2) \le 3.88$ are satisfied, the resolution can be increased effectively and the aberration can be corrected effectively.

A detailed description of a lens assembly in accordance with a first embodiment of the invention is as follows. Referring to FIG. 1, the lens assembly 1 includes a stop ST1, a first lens L11, a second lens L12, a third lens L13, an optical filter OF1, and a cover glass CG1, all of which are arranged in order from an object side to an image side along an optical axis OA1. In operation, the light from the object side is imaged on an image plane IMA1.

According to the foregoing, wherein: the third lens L13 is a meniscus lens, wherein the object side surface S16 is a convex surface; both of the object side surface S18 and image side surface S19 of the optical filter OF1 are plane surfaces; both of the object side surface S110 and image side surface S111 of the cover glass CG1 are plane surfaces; and with the above design of the lenses, stop ST1, and at least one of the conditions (1)-(14) satisfied, the lens assembly 1 can have an effective increased resolution and an effective corrected aberration.

Table 1 shows the optical specification of the lens assembly 1 in FIG. 1.

TABLE 1

Effective Focal Length = 4.65 mm; F-number = 2.00
Total Lens Length = 7.96 mm; Field of View = 67.46 degrees

| Surface Number | Radius of Curvature (mm) | Thickness (mm) | Nd | Vd | Effective Focal Length (mm) | Remark |
|---|---|---|---|---|---|---|
| S11 | ∞ | −0.120 | | | | ST1 |
| S12 | 4.830 | 1.105 | 1.9007 | 37.116 | 7.862 | L11 |
| S13 | 14.330 | 1.466 | | | | |
| S14 | −3.652 | 2.173 | 1.5445 | 56.003 | 3.754 | L12 |
| S15 | −1.565 | 0.050 | | | | |
| S16 | 2.340 | 0.844 | 1.6713 | 19.243 | −6.311 | L13 |
| S17 | 1.280 | 1.013 | | | | |
| S18 | ∞ | 0.300 | 1.5168 | 64.167 | | OF1 |
| S19 | ∞ | 0.563 | | | | |
| S110 | ∞ | 0.400 | 1.5168 | 64.167 | | CG1 |
| S111 | ∞ | 0.045 | | | | |

In the first embodiment, the conic constant k and the aspheric coefficients A, B, C, D, E, F, G of each aspheric lens are shown in Table 2.

TABLE 2

| Surface Number | k | A<br>E | B<br>F | C<br>G | D |
|---|---|---|---|---|---|
| S14 | 2.908 | −3.00E−03<br>−3.22E−03 | −1.50E−02<br>9.83E−04 | 4.31E−03<br>−9.20E−05 | 3.34E−03 |
| S15 | −3.975 | −9.02E−02<br>−8.97E−04 | 4.48E−02<br>8.15E−05 | −1.90E−02<br>−2.81E−06 | 5.27E−03 |
| S16 | −0.722 | −6.64E−02<br>4.75E−05 | 1.39E−02<br>−4.43E−06 | −1.18E−03<br>1.48E−07 | −1.51E−04 |
| S17 | −0.837 | −1.46E−01<br>−2.06E−04 | 4.33E−02<br>1.36E−05 | −1.07E−02<br>−4.01E−07 | 1.82E−03 |

Table 3 shows the parameters and condition values for conditions (1)-(14) in accordance with the first embodiment of the invention. It can be seen from Table 3 that the lens assembly 1 of the first embodiment satisfies the conditions (1)-(14).

TABLE 3

| | | | | | |
|---|---|---|---|---|---|
| Air1 | 1.47 mm | Air2 | 0.05 mm | Air3 | 1.01 mm |
| CT1 | 1.11 mm | CT2 | 2.17 mm | CT3 | 0.84 mm |
| BFL | 2.32 mm | | | | |
| (R12/R32) × Air3 | 11.34 mm | R32 − (f1 + f3) | −10.34 mm | R21 × (f3/Nd1) | 12.13 $mm^2$ |
| $(R21 \times R22)^{0.5}$/Air3 | 2.36 | (f1 × (f2 + f3))/R21 | 5.50 mm | R12/CT1 | 12.97 |
| (R12 + R21 + R22)/CT3 | 10.80 | f3/(Vd2/Vd3) | −2.17 mm | $(f2/R11)^{0.5}$ | 0.88 |
| f2/(CT3/Air3) | 4.51 mm | (Air1 + Air2)/BFL | 0.65 | (f1 + f2)/f | 2.50 |
| f/Air1 | 3.17 | TTL/(CT2 + Air2) | 3.58 | | |

In addition, the lens assembly 1 of the first embodiment can meet the requirements of optical performance as seen in FIGS. 2-5. It can be seen from FIG. 2 that the longitudinal aberration in the lens assembly 1 of the first embodiment ranges from −0.01 mm to 0.04 mm. It can be seen from FIG. 3 that the field curvature of tangential direction and sagittal direction in the lens assembly 1 of the first embodiment ranges from −0.04 mm to 0.07 mm. It can be seen from FIG. 4 that the distortion in the lens assembly 1 of the first embodiment ranges from −1.2% to 1.2%. It can be seen from FIG. 5 that the relative illumination in the lens assembly 1 of the first embodiment ranges from 0.50 to 1.0. It is obvious that the longitudinal aberration, the field curvature, the distortion, and the relative illumination of the lens assembly 1 of the first embodiment can be corrected effectively. Therefore, the lens assembly 1 of the first embodiment is capable of good optical performance.

Figure 6:
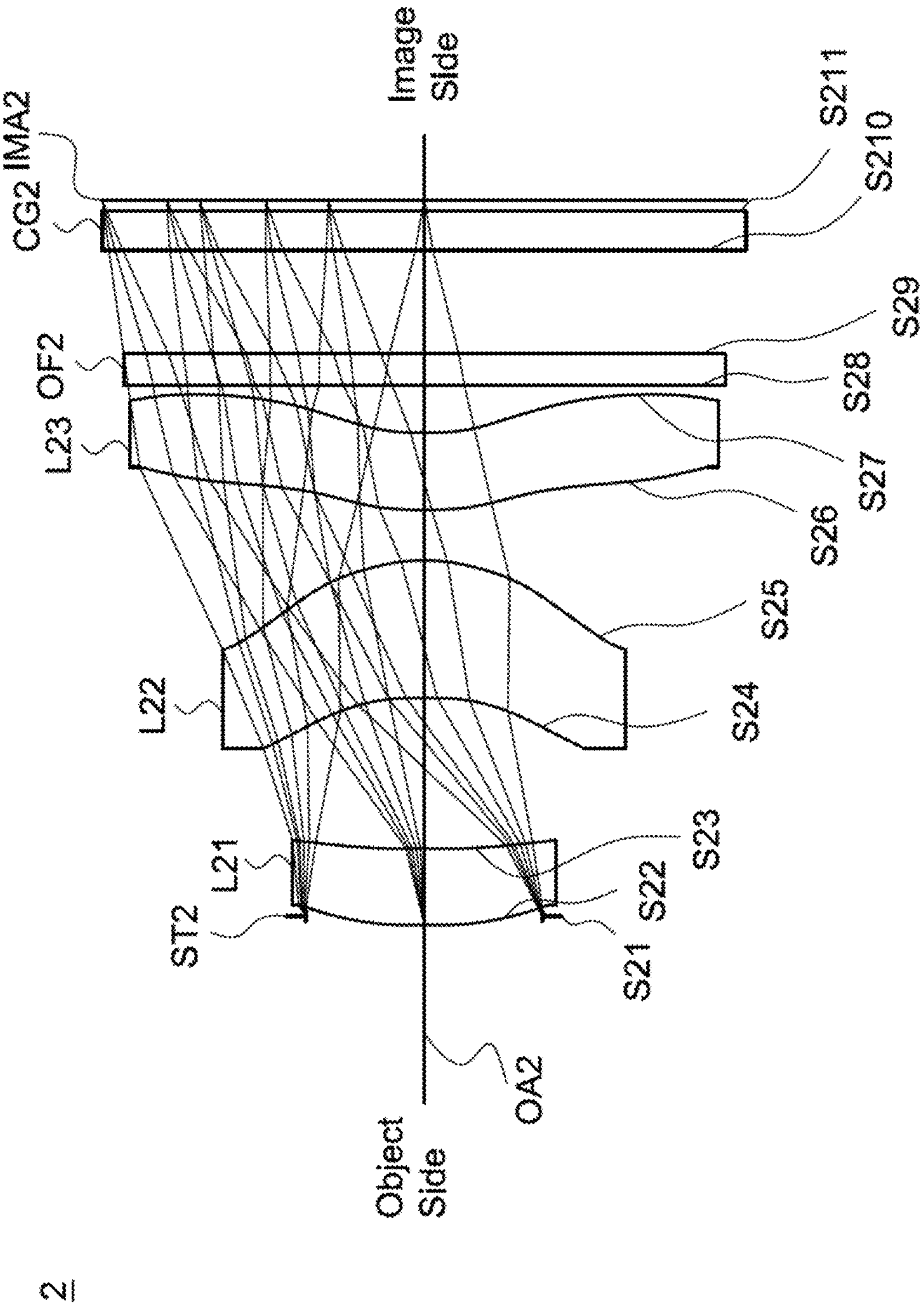
FIG. 6 is a lens layout and optical path diagram of a lens assembly in accordance with a second embodiment of the invention.

A detailed description of a lens assembly in accordance with a second embodiment of the invention is as follows. Referring to FIG. 6, the lens assembly 2 includes a stop ST2, a first lens L21, a second lens L22, a third lens L23, an optical filter OF2, and a cover glass CG2, all of which are arranged in order from an object side to an image side along an optical axis OA2. In operation, the light from the object side is imaged on an image plane IMA2.

According to the foregoing, wherein: the third lens L23 is a meniscus lens, wherein the object side surface S26 is a convex surface; both of the object side surface S28 and image side surface S29 of the optical filter OF2 are plane surfaces; both of the object side surface S210 and image side surface S211 of the cover glass CG2 are plane surfaces; and with the above design of the lenses, stop ST2, and at least one of the conditions (1)-(14) satisfied, the lens assembly 2 can have an effective increased resolution and an effective corrected aberration.

Table 4 shows the optical specification of the lens assembly 2 in FIG. 6.

TABLE 4

Effective Focal Length = 4.80 mm F-number = 2.00
Total Lens Length = 7.03 mm Field of View = 66.28 degrees

| Surface Number | Radius of Curvature (mm) | Thickness (mm) | Nd | Vd | Effective Focal Length (mm) | Remark |
|---|---|---|---|---|---|---|
| S21 | ∞ | −0.093 | | | | ST2 |
| S22 | 3.901 | 0.745 | 2.1042 | 17.018 | 6.353 | L21 |
| S23 | 8.459 | 1.469 | | | | |
| S24 | −2.644 | 1.323 | 1.6613 | 20.382 | 7.917 | L22 |
| S25 | −2.069 | 0.497 | | | | |
| S26 | 2.416 | 0.739 | 1.6713 | 19.243 | −20.93 | L23 |
| S27 | 1.803 | 0.464 | | | | |
| S28 | ∞ | 0.300 | 1.5168 | 64.167 | | OF2 |
| S29 | ∞ | 0.995 | | | | |
| S210 | ∞ | 0.400 | 1.5168 | 64.167 | | CG2 |
| S211 | ∞ | 0.100 | | | | |

In the second embodiment, the conic constant k and the aspheric coefficients A, B, C, D, E, F, G of each aspheric lens are shown in Table 5.

TABLE 5

| Surface Number | k | A<br>E | B<br>F | C<br>G | D |
|---|---|---|---|---|---|
| S24 | 0.467 | −6.48E−03<br>−7.19E−04 | −1.18E−02<br>0 | 7.53E−03<br>0 | 1.61E−03 |
| S25 | −0.030 | −1.94E−02<br>−1.43E−04 | 2.01E−02<br>0 | −7.46E−03<br>0 | 2.07E−03 |
| S26 | −6.857 | −4.08E−02<br>−5.09E−06 | 1.12E−02<br>0 | −1.61E−03<br>0 | 1.34E−04 |
| S27 | −4.281 | −3.84E−02<br>−3.96E−06 | 8.08E−03<br>0 | −1.17E−03<br>0 | 1.03E−04 |

Table 6 shows the parameters and condition values for conditions (1)-(14) in accordance with the second embodiment of the invention. It can be seen from Table 6 that the lens assembly 2 of the second embodiment satisfies the conditions (1)-(14).

TABLE 6

| | | | | | |
|---|---|---|---|---|---|
| Air1 | 1.47 mm | Air2 | 0.50 mm | Air3 | 0.46 mm |
| CT1 | 0.75 mm | CT2 | 1.32 mm | CT3 | 0.74 mm |
| BFL | 2.26 mm | | | | |
| (R12/R32) × Air3 | 2.18 mm | R32 − (f1 + f3) | −12.47 mm | R21 × (f3/Nd1) | 26.30 $mm^2$ |
| $(R21 \times R22)^{0.5}$/Air3 | 5.04 | (f1 × (f2 + f3))/R21 | 31.27 mm | R12/CT1 | 11.35 |
| (R12 + R21 + R22)/CT3 | 5.07 | f3/(Vd2/Vd3) | −19.76 mm | $(f2/R11)^{0.5}$ | 1.42 |
| f2/(CT3/Air3) | 4.97 mm | (Air1 + Air2)/BFL | 0.87 | (f1 + f2)/f | 2.97 |
| f/Air1 | 3.27 | TTL/(CT2 + Air2) | 3.86 | | |

Figure 7:
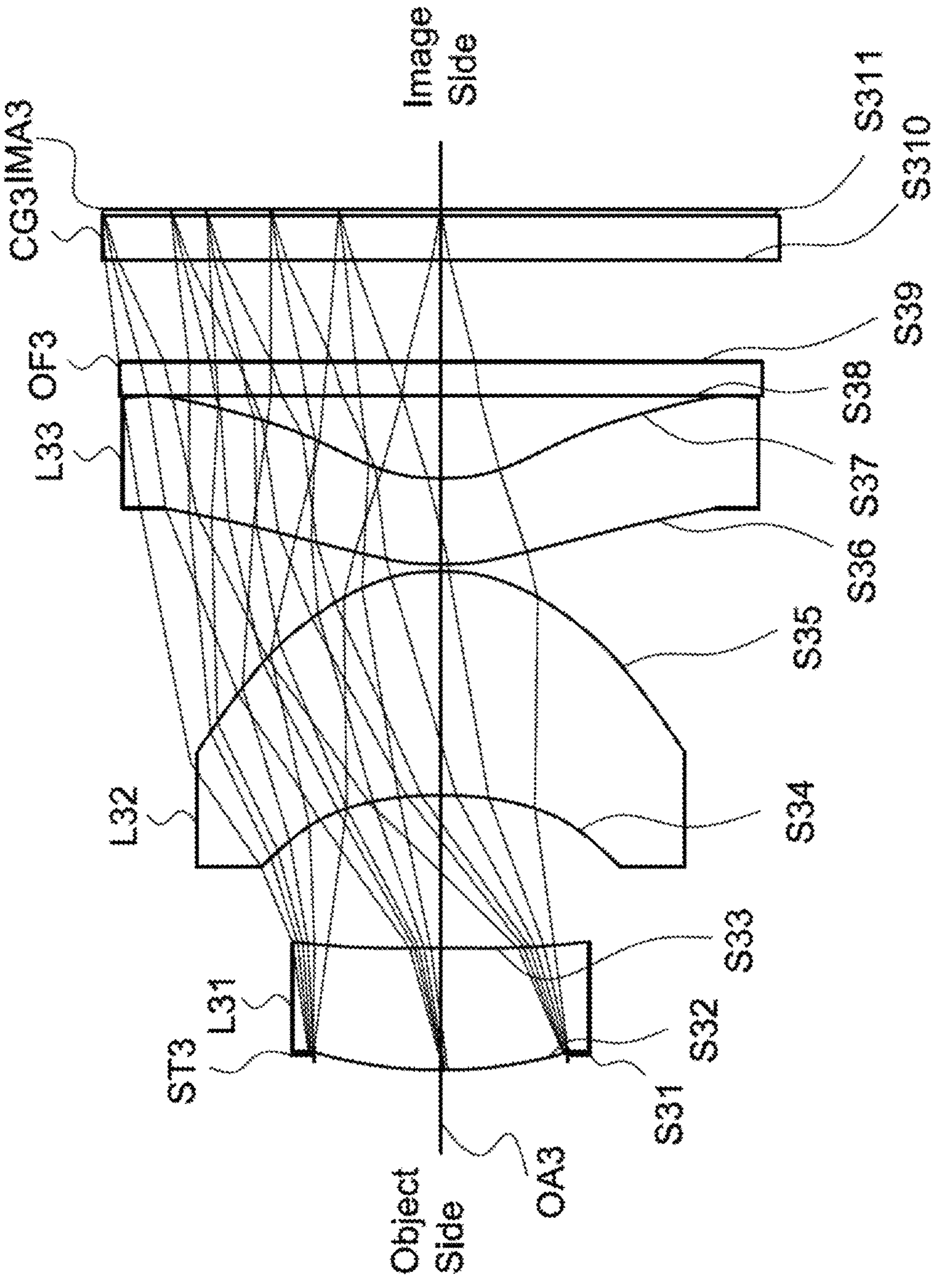
FIG. 7 is a lens layout and optical path diagram of a lens assembly in accordance with a third embodiment of the invention.
Figure 8:
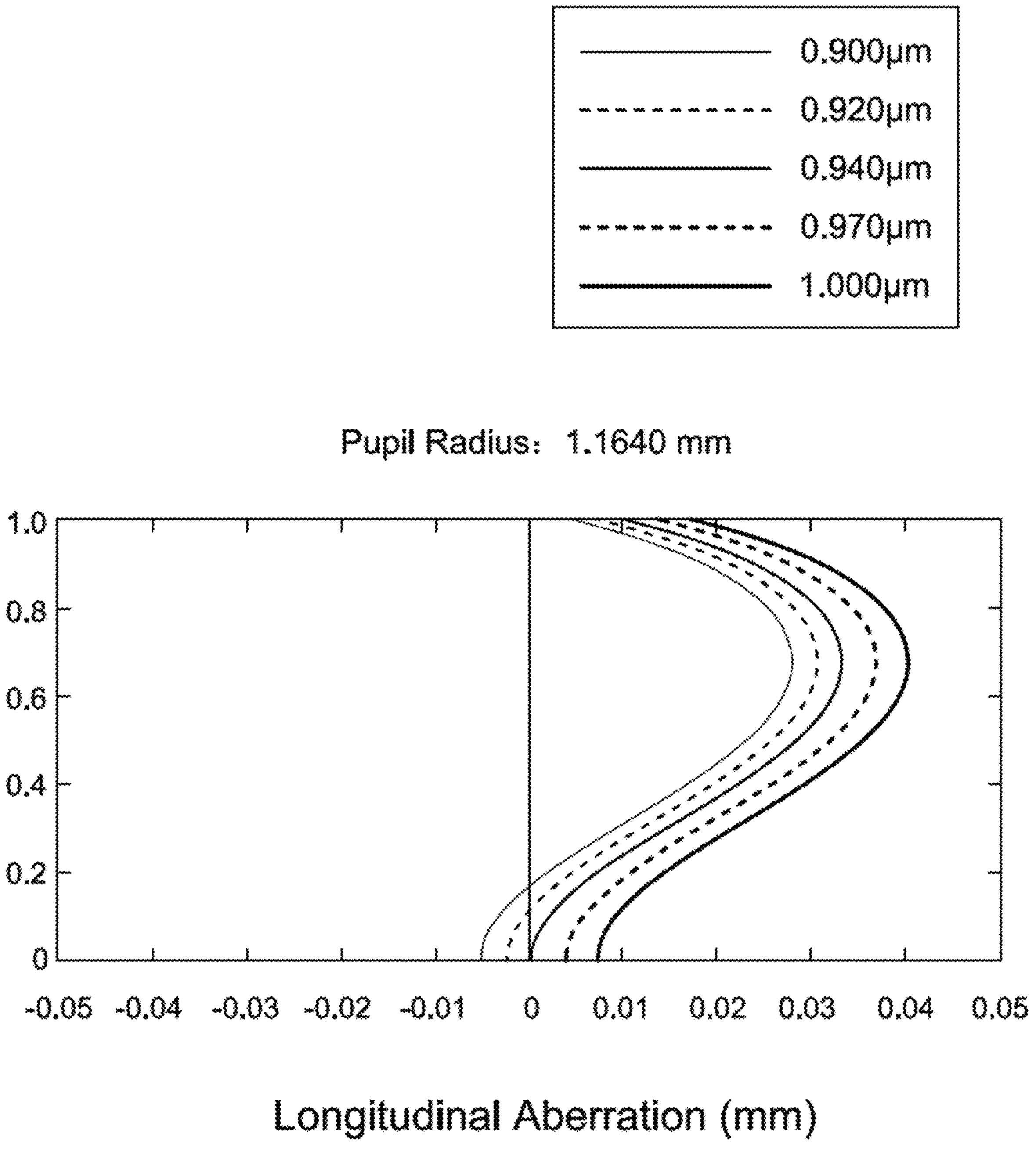
FIGS. 8, 9, 10, 11 depict a longitudinal aberration diagram, a field curvature diagram, a distortion diagram, and a relative illumination diagram of the lens assembly in accordance with the third embodiment of the invention, respectively.
Figure 9:
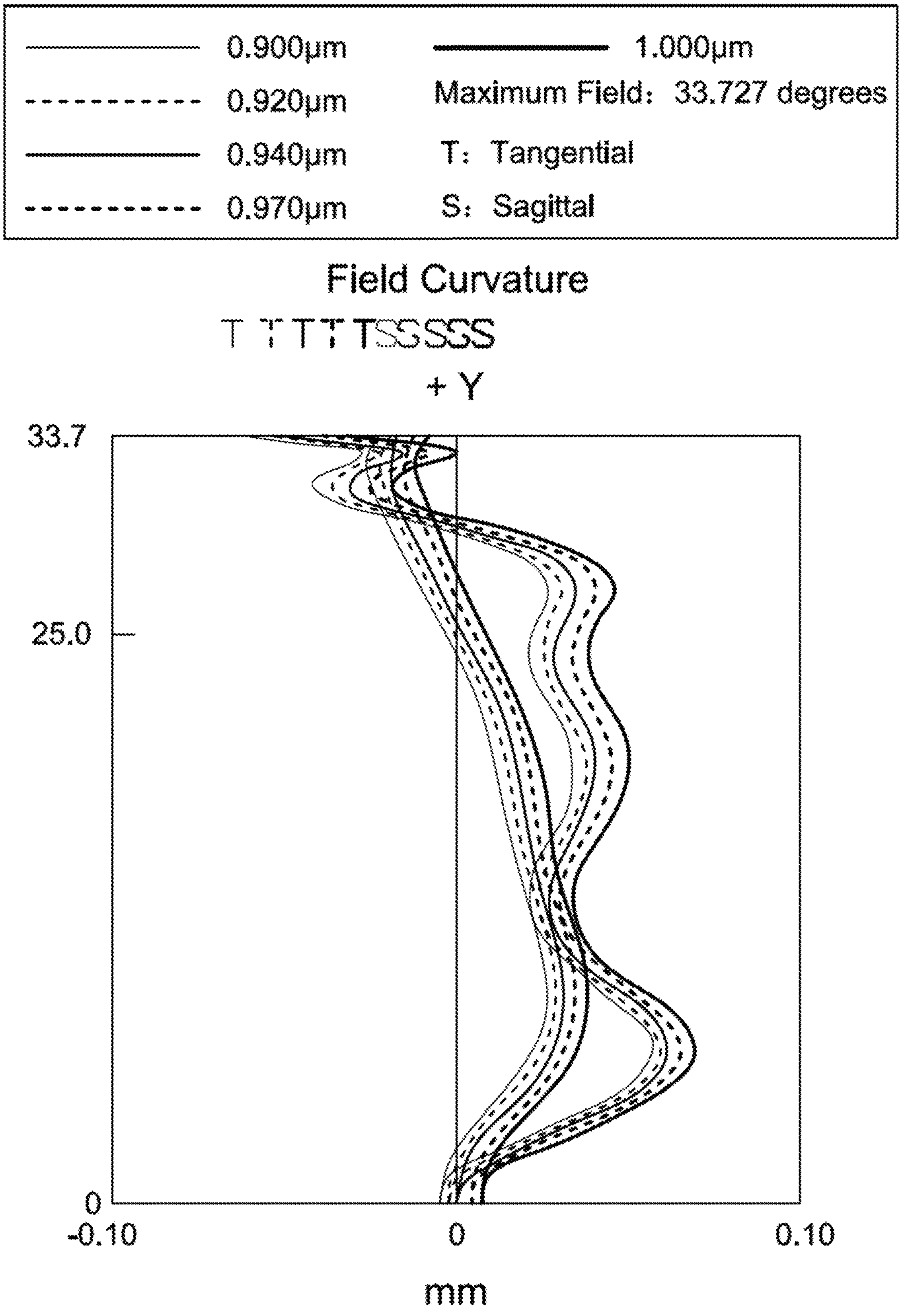
Figure 10:
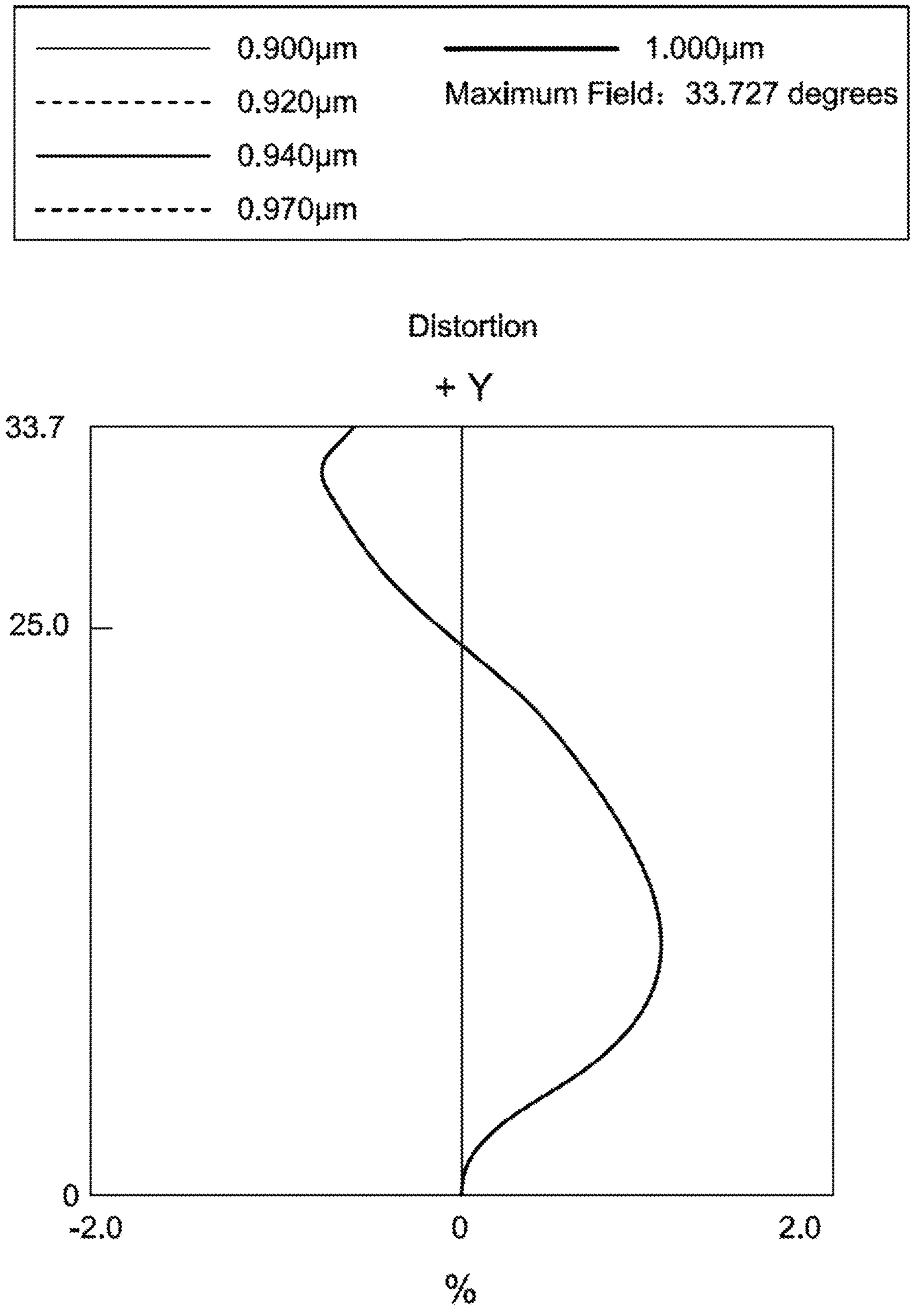
Figure 11:
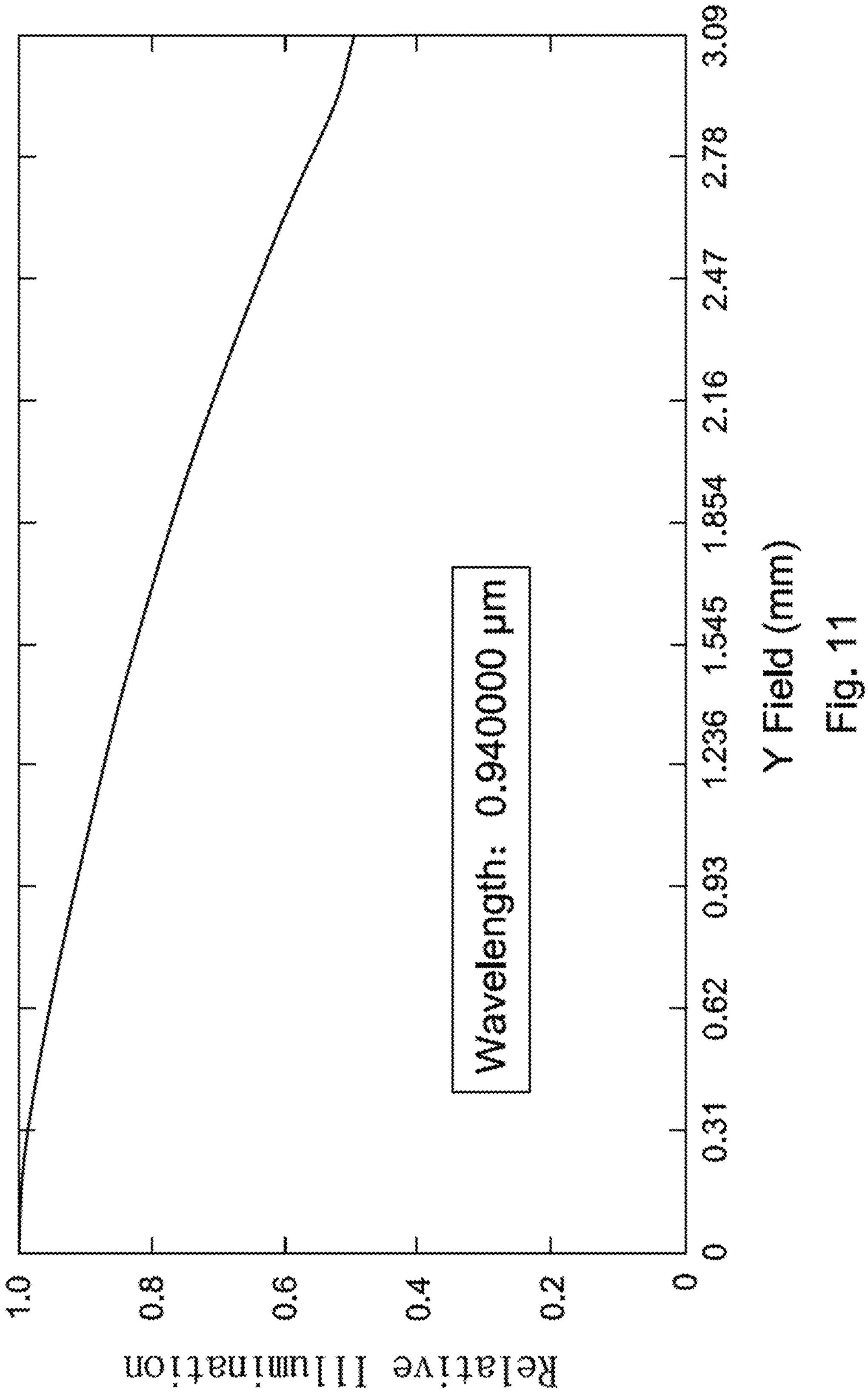

A detailed description of a lens assembly in accordance with a third embodiment of the invention is as follows. Referring to FIG. 7, the lens assembly 3 includes a stop ST3, a first lens L31, a second lens L32, a third lens L33, an optical filter OF3, and a cover glass CG3, all of which are arranged in order from an object side to an image side along an optical axis OA3. In operation, the light from the object side is imaged on an image plane IMA3.

According to the foregoing, wherein: the third lens L33 is a meniscus lens, wherein the object side surface S36 is a convex surface; both of the object side surface S38 and image side surface S39 of the optical filter OF3 are plane surfaces; both of the object side surface S310 and image side surface S311 of the cover glass CG3 are plane surfaces; and with the above design of the lenses, stop ST3, and at least one of the conditions (1)-(14) satisfied, the lens assembly 3 can have an effective increased resolution and an effective corrected aberration.

Table 7 shows the optical specification of the lens assembly 3 in FIG. 7.

TABLE 7

Effective Focal Length = 4.66 mm; F-number = 2.00
Total Lens Length = 7.88 mm; Field of View = 67.32 degrees

| Surface Number | Radius of Curvature (mm) | Thickness (mm) | Nd | Vd | Effective Focal Length (mm) | Remark |
|---|---|---|---|---|---|---|
| S31 | ∞ | −0.120 | | | | ST3 |
| S32 | 4.885 | 1.105 | 1.9007 | 37.116 | 7.683 | L31 |
| S33 | 15.815 | 1.391 | | | | |
| S34 | −3.178 | 2.083 | 1.5445 | 56.003 | 4.026 | L32 |
| S35 | −1.578 | 0.050 | | | | |
| S36 | 2.197 | 0.786 | 1.6713 | 19.243 | −7.544 | L33 |
| S37 | 1.301 | 0.773 | | | | |
| S38 | ∞ | 0.300 | 1.5168 | 64.167 | | OF3 |
| S39 | ∞ | 0.946 | | | | |
| S310 | ∞ | 0.400 | 1.5168 | 64.167 | | CG3 |
| S311 | ∞ | 0.045 | | | | |

In the third embodiment, the conic constant k and the aspheric coefficients A, B, C, D, E, F, G of each aspheric lens are shown in Table 8.

TABLE 8

| Surface Number | k | A<br>E | B<br>F | C<br>G | D |
|---|---|---|---|---|---|
| S34 | 2.272 | 1.88E−03<br>−3.40E−03 | −1.52E−02<br>8.69E−04 | 3.66E−03<br>−4.90E−05 | 4.35E−03 |
| S35 | −4.089 | −9.28E−02<br>−8.88E−04 | 4.59E−02<br>7.54E−05 | −1.95E−02<br>−2.17E−06 | 5.36E−03 |
| S36 | −0.767 | −6.80E−02<br>4.73E−05 | 1.37E−02<br>−4.60E−06 | −1.20E−03<br>1.58E−07 | −1.42E−04 |
| S37 | −0.831 | −1.43E−01<br>−2.06E−04 | 4.22E−02<br>1.36E−05 | −1.06E−02<br>−3.98E−07 | 1.82E−03 |

Table 9 shows the parameters and condition values for conditions (1)-(14) in accordance with the third embodiment of the invention. It can be seen from Table 9 that the lens assembly 3 of the third embodiment satisfies the conditions (1)-(14).

TABLE 9

| | | | | | |
|---|---|---|---|---|---|
| Air1 | 1.39 mm | Air2 | 0.05 mm | Air3 | 0.77 mm |
| CT1 | 1.11 mm | CT2 | 2.08 mm | CT3 | 0.79 mm |
| BFL | 2.46 mm | | | | |
| (R12/R32) × Air3 | 9.40 mm | R32 − (f1 + f3) | −10.41 mm | R21 × (f3/Nd1) | 12.61 $mm^2$ |
| $(R21 \times R22)^{0.5}$/Air3 | 2.90 | (f1 × (f2 + f3))/R21 | 8.50 mm | R12/CT1 | 14.31 |
| (R12 + R21 + R22)/CT3 | 14.07 | f3/(Vd2/Vd3) | −2.59 mm | $(f2/R11)^{0.5}$ | 0.91 |
| f2/(CT3/Air3) | 3.96 mm | (Air1 + Air2)/BFL | 0.58 | (f1 + f2)/f | 2.51 |
| f/Air1 | 3.35 | TTL/(CT2 + Air2) | 3.69 | | |

In addition, the lens assembly 3 of the third embodiment can meet the requirements of optical performance as seen in FIGS. 8-11. It can be seen from FIG. 8 that the longitudinal aberration in the lens assembly 3 of the third embodiment ranges from −0.01 mm to 0.04 mm. It can be seen from FIG. 9 that the field curvature of tangential direction and sagittal direction in the lens assembly 3 of the third embodiment ranges from −0.06 mm to 0.07 mm. It can be seen from FIG. 10 that the distortion in the lens assembly 3 of the third embodiment ranges from −0.8% to 1.2%. It can be seen from FIG. 11 that the relative illumination in the lens assembly 3 of the third embodiment ranges from 0.50 to 1.0. It is obvious that the longitudinal aberration, the field curvature, the distortion, and the relative illumination of the lens assembly 3 of the third embodiment can be corrected effectively. Therefore, the lens assembly 3 of the third embodiment is capable of good optical performance.

Figure 12:
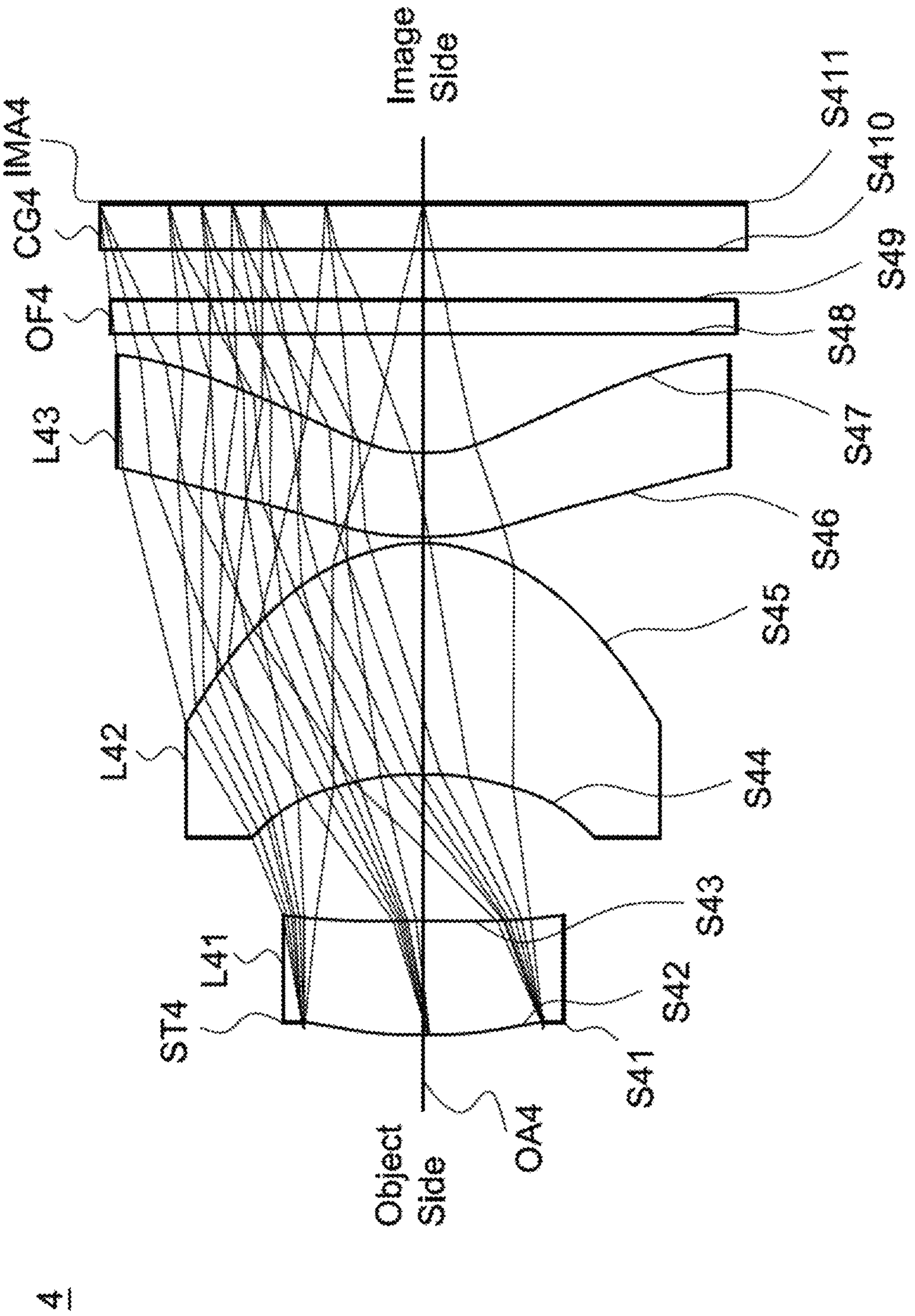
FIG. 12 is a lens layout and optical path diagram of a lens assembly in accordance with a fourth embodiment of the invention.
Figure 13:
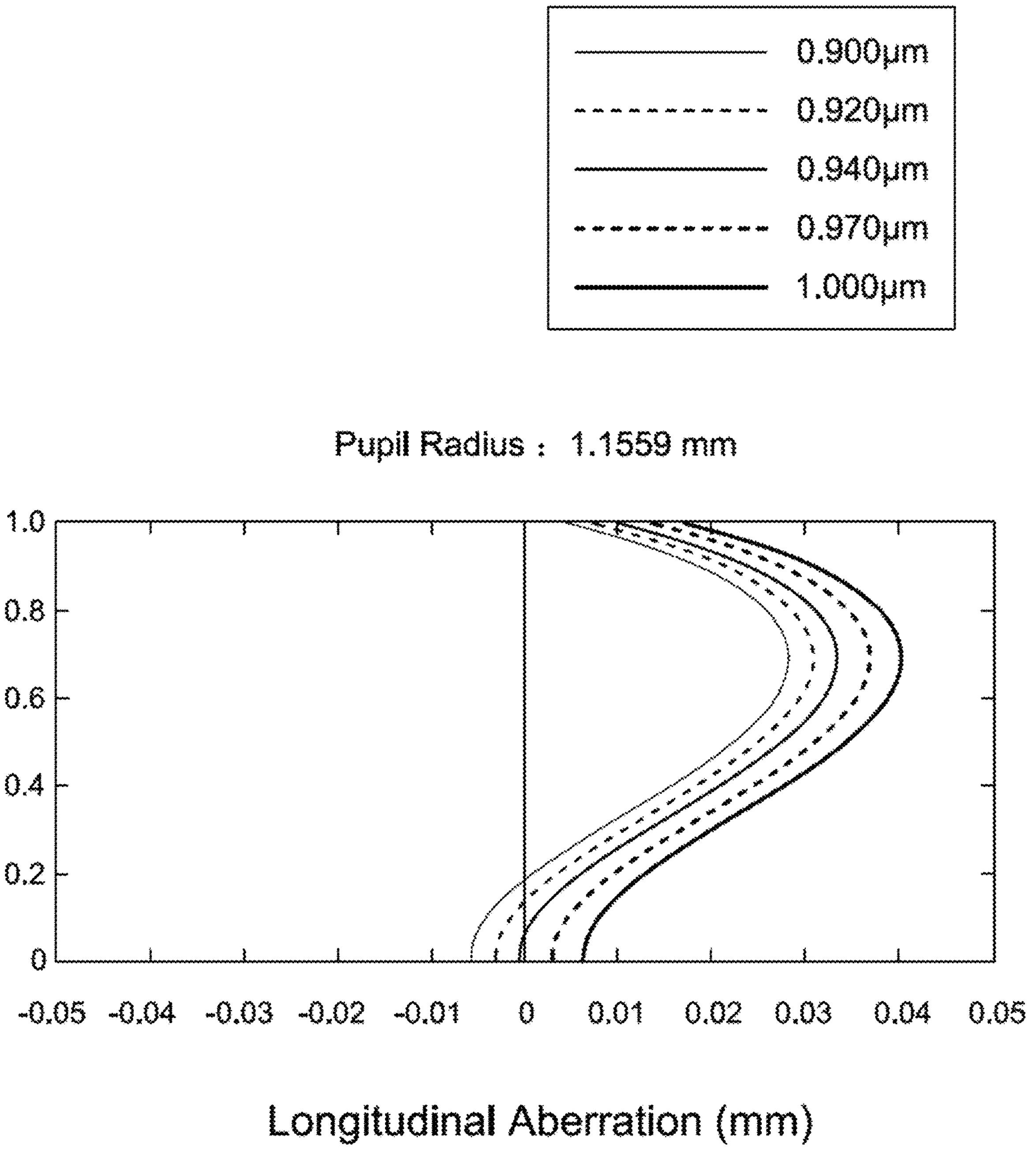
FIGS. 13, 14, 15, 16 depict a longitudinal aberration diagram, a field curvature diagram, a distortion diagram, and a relative illumination diagram of the lens assembly in accordance with the fourth embodiment of the invention, respectively.
Figure 14:
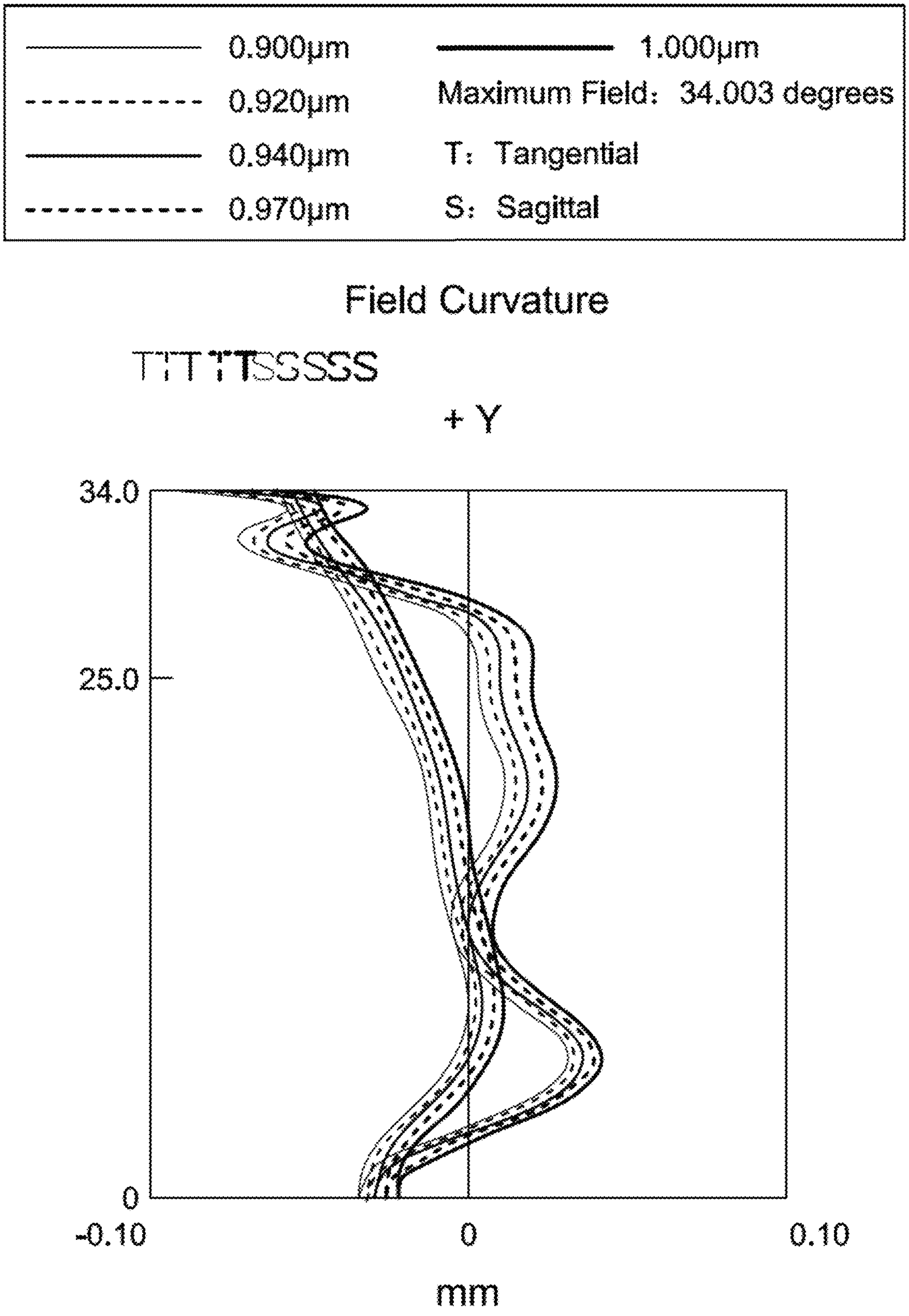
Figure 15:
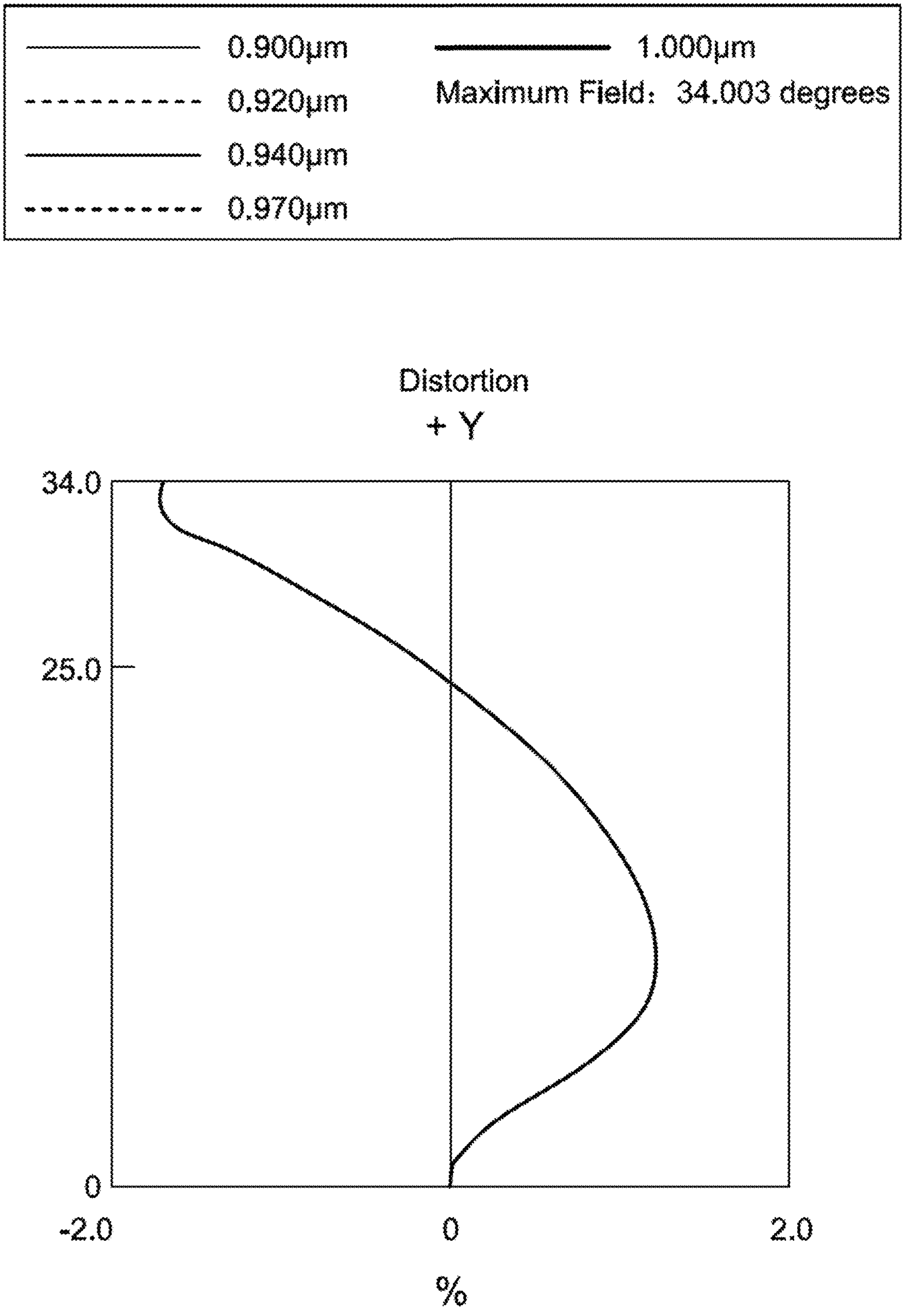
Figure 16:
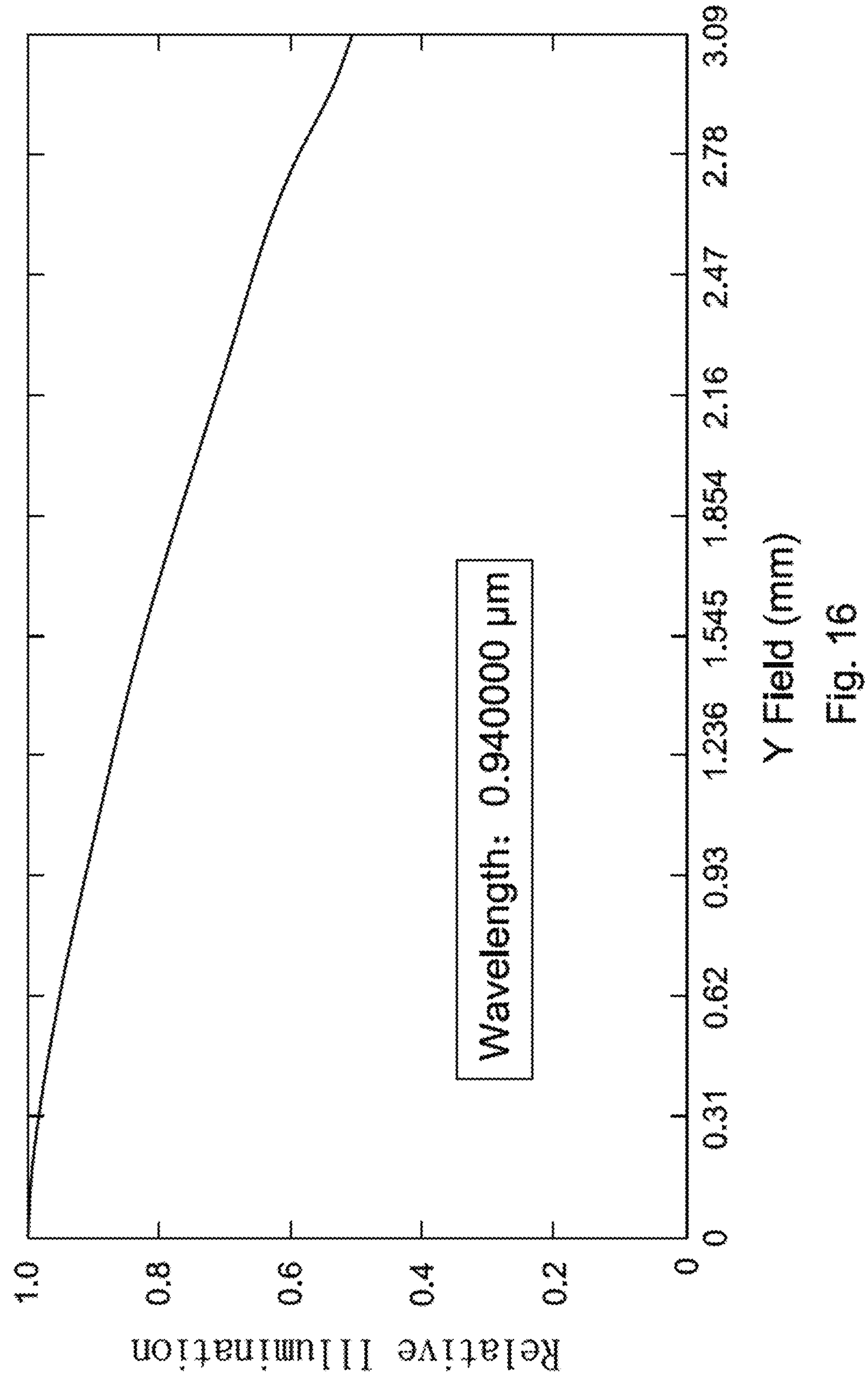

A detailed description of a lens assembly in accordance with a fourth embodiment of the invention is as follows. Referring to FIG. 12, the lens assembly 4 includes a stop ST4, a first lens L41, a second lens L42, a third lens L43, an optical filter OF4, and a cover glass CG4, all of which are arranged in order from an object side to an image side along an optical axis OA4. In operation, the light from the object side is imaged on an image plane IMA4.

According to the foregoing, wherein: the third lens L43 is a meniscus lens, wherein the object side surface S46 is a convex surface; both of the object side surface S48 and image side surface S49 of the optical filter OF4 are plane surfaces; both of the object side surface S410 and image side surface S411 of the cover glass CG4 are plane surfaces; and with the above design of the lenses, stop ST4, and at least one of the conditions (1)-(14) satisfied, the lens assembly 4 can have an effective increased resolution and an effective corrected aberration.

Table 10 shows the optical specification of the lens assembly 4 in FIG. 12.

TABLE 10

Effective Focal Length = 4.62 mm; F-number = 2.00; Total Lens Length = 8.01 mm; Field of View = 68.01 degrees

| Surface Number | Radius of Curvature (mm) | Thickness (mm) | Nd | Vd | Effective Focal Length (mm) | Remark |
|---|---|---|---|---|---|---|
| S41 | ∞ | −0.120 | | | | ST4 |
| S42 | 4.989 | 1.105 | 1.9007 | 37.116 | 8.023 | L41 |
| S43 | 15.312 | 1.401 | | | | |
| S44 | −3.692 | 2.237 | 1.5445 | 56.003 | 3.77 | L42 |
| S45 | −1.580 | 0.050 | | | | |
| S46 | 2.218 | 0.808 | 1.6567 | 21.213 | −6.657 | L43 |
| S47 | 1.247 | 1.166 | | | | |
| S48 | ∞ | 0.300 | 1.5168 | 64.167 | | OF4 |
| S49 | ∞ | 0.500 | | | | |
| S410 | ∞ | 0.400 | 1.5168 | 64.167 | | CG4 |
| S411 | ∞ | 0.045 | | | | |

In the fourth embodiment, the conic constant k and the aspheric coefficients A, B, C, D, E, F, G of each aspheric lens are shown in Table 11.

TABLE 11

| Surface Number | k | A<br>E | B<br>F | C<br>G | D |
|---|---|---|---|---|---|
| S44 | 3.261 | −1.72E−03<br>−3.24E−03 | −1.43E−02<br>1.00E−03 | 4.40E−03<br>−8.99E−05 | 3.19E−03 |
| S45 | −4.093 | −8.91E−02<br>−9.00E−04 | 4.43E−02<br>8.17E−05 | −1.88E−02<br>−2.78E−06 | 5.25E−03 |
| S46 | −0.742 | −6.69E−02<br>4.73E−05 | 1.36E−02<br>−4.42E−06 | −1.17E−03<br>1.48E−07 | −1.50E−04 |
| S47 | −0.844 | −1.46E−01<br>−2.05E−04 | 4.33E−02<br>1.36E−05 | −1.07E−02<br>−4.05E−07 | 1.82E−03 |

Table 12 shows the parameters and condition values for conditions (1)-(14) in accordance with the fourth embodiment of the invention. It can be seen from Table 12 that the lens assembly 4 of the fourth embodiment satisfies the conditions (1)-(14).

TABLE 12

| | | | | | |
|---|---|---|---|---|---|
| Air1 | 1.40 mm | Air2 | 0.05 mm | Air3 | 1.17 mm |
| CT1 | 1.11 mm | CT2 | 2.24 mm | CT3 | 0.81 mm |
| BFL | 2.41 mm | | | | |
| (R12/R32) × Air3 | 14.32 mm | R32 − (f1 + f3) | −10.55 mm | R21 × (f3/Nd1) | 12.93 $mm^2$ |
| $(R21 \times R22)^{0.5}$/Air3 | 2.07 | (f1 × (f2 + f3))/R21 | 6.27 mm | R12/CT1 | 13.86 |
| (R12 + R21 + R22)/CT3 | 12.43 | f3/(Vd2/Vd3) | −2.52 mm | $(f2/R11)^{0.5}$ | 0.87 |
| f2/(CT3/Air3) | 5.44 mm | (Air1 + Air2)/BFL | 0.60 | (f1 + f2)/f | 2.55 |
| f/Air1 | 3.30 | TTL/(CT2 + Air2) | 3.50 | | |

In addition, the lens assembly 4 of the fourth embodiment can meet the requirements of optical performance as seen in FIGS. 13-16. It can be seen from FIG. 13 that the longitudinal aberration in the lens assembly 4 of the fourth embodiment ranges from −0.01 mm to 0.04 mm. It can be seen from FIG. 14 that the field curvature of tangential direction and sagittal direction in the lens assembly 4 of the fourth embodiment ranges from −0.10 mm to 0.05 mm. It can be seen from FIG. 15 that the distortion in the lens assembly 4 of the fourth embodiment ranges from −1.8% to 1.3%. It can be seen from FIG. 16 that the relative illumination in the lens assembly 4 of the fourth embodiment ranges from 0.51 to 1.0. It is obvious that the longitudinal aberration, the field curvature, the distortion, and the relative illumination of the lens assembly 4 of the fourth embodiment can be corrected effectively. Therefore, the lens assembly 4 of the fourth embodiment is capable of good optical performance.

Figure 17:
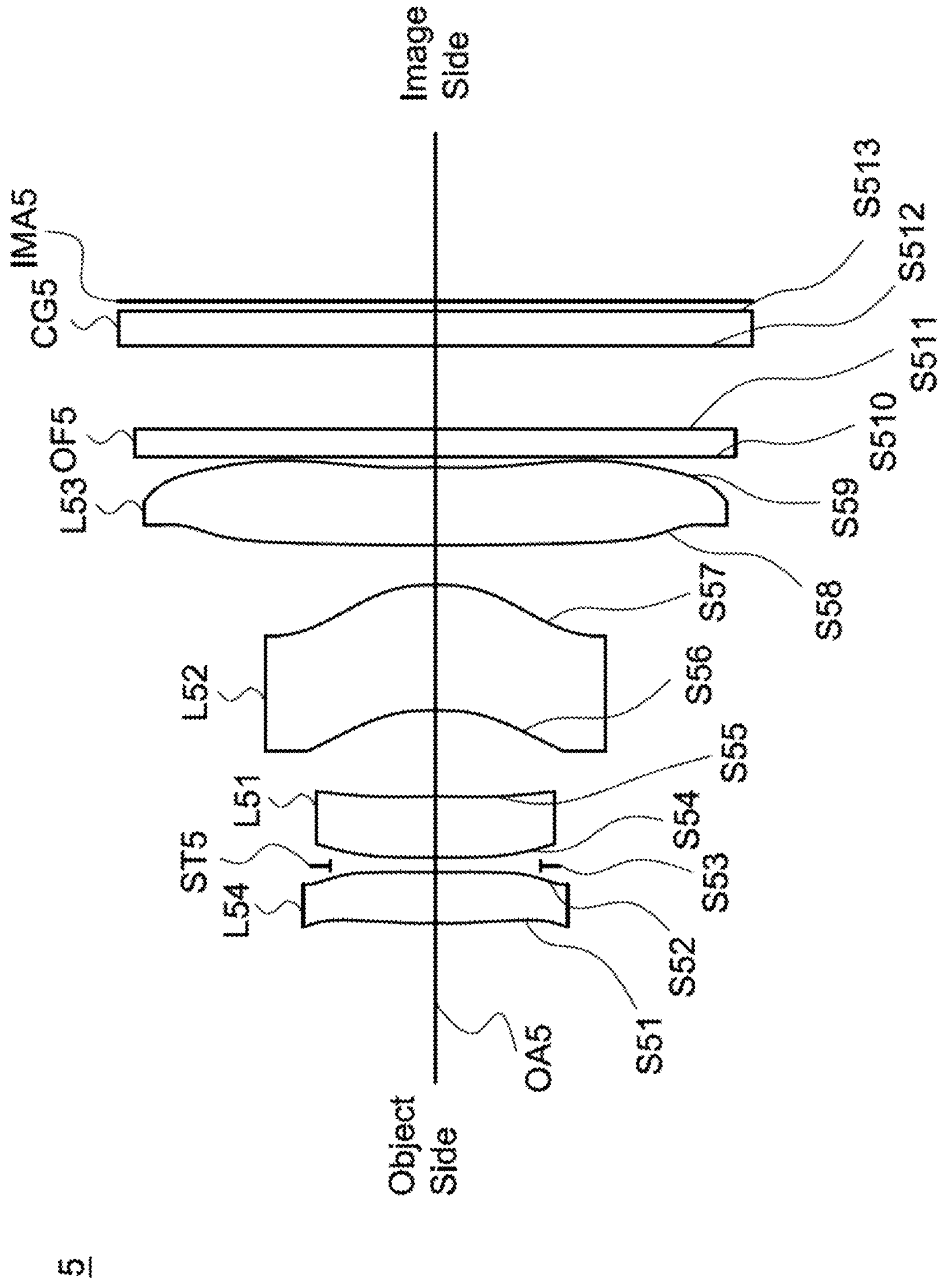
FIG. 17 is a lens layout diagram of a lens assembly in accordance with a fifth embodiment of the invention.

A detailed description of a lens assembly in accordance with a fifth embodiment of the invention is as follows. Referring to FIG. 17, the lens assembly 5 includes a fourth lens L54, a stop ST5, a first lens L51, a second lens L52, a third lens L53, an optical filter OF5, and a cover glass CG5, all of which are arranged in order from an object side to an image side along an optical axis OA5. In operation, the light from the object side is imaged on an image plane IMA5.

According to the foregoing, wherein: the fourth lens L54 is a biconvex lens with positive refractive power and made of plastic material, wherein the object side surface S51 is a convex surface, the image side surface S52 is a convex surface, and both of the object side surface S51 and image side surface S52 are aspheric surfaces; the third lens L53 is a biconcave lens, wherein the object side surface S58 is a concave surface; both of the object side surface S510 and image side surface S511 of the optical filter OF5 are plane surfaces; both of the object side surface S512 and image side surface S513 of the cover glass CG5 are plane surfaces; and with the above design of the lenses, stop ST5, and at least one of the conditions (1)-(14) satisfied, the lens assembly 5 can have an effective increased resolution and an effective corrected aberration.

Table 13 shows the optical specification of the lens assembly 5 in FIG. 17.

TABLE 13

Effective Focal Length = 4.70 mm; F-number = 2.10
Total Lens Length = 7.20 mm; Field of View = 65.18 degrees

| Surface Number | Radius of Curvature (mm) | Thickness (mm) | Nd | Vd | Effective Focal Length (mm) | Remark |
|---|---|---|---|---|---|---|
| S51 | 8.656 | 0.599 | 1.6713 | 19.243 | 9.284 | L54 |
| S52 | −18.764 | 0.067 | | | | |
| S53 | ∞ | 0.088 | | | | ST5 |
| S54 | 5.170 | 0.696 | 2.1042 | 17.018 | 7.945 | L51 |
| S55 | 12.639 | 1.017 | | | | |
| S56 | −1.624 | 1.449 | 1.6613 | 20.382 | 4.290 | L52 |
| S57 | −1.370 | 0.469 | | | | |
| S58 | −35.004 | 0.873 | 1.6713 | 19.243 | −5.366 | L53 |
| S59 | 3.869 | 0.168 | | | | |
| S510 | ∞ | 0.300 | 1.5168 | 64.167 | | OF5 |
| S511 | ∞ | 0.975 | | | | |
| S512 | ∞ | 0.40 | 1.5168 | 64.167 | | CG5 |
| S513 | ∞ | 0.10 | | | | |

In the fifth embodiment, the conic constant k and the aspheric coefficients A, B, C, D, E, F, G of each aspheric lens are shown in Table 14.

TABLE 14

| Surface Number | k | A<br>E | B<br>F | C<br>G | D |
|---|---|---|---|---|---|
| S51 | −1.27E+01 | −2.28E−02<br>0 | −3.55E−03<br>0 | −2.05E−03<br>0 | 0 |
| S52 | 4.59E+01 | −3.09E−02<br>0 | −4.29E−03<br>0 | 4.04E−05<br>0 | 0 |
| S56 | −5.49E−01 | −1.93E−02<br>−3.13E−04 | 4.04E−02<br>0 | −1.94E−03<br>0 | −1.04E−03 |
| S57 | −1.00E+00 | 4.86E−02<br>−9.39E−05 | −1.25E−02<br>0 | 7.31E−03<br>0 | −5.30E−04 |
| S58 | −9.88E+01 | 9.78E−03<br>−5.06E−06 | 2.53E−04<br>0 | −4.42E−04<br>0 | 8.30E−05 |
| S59 | −2.69E+01 | −2.99E−02<br>−8.23E−06 | 8.45E−03<br>0 | −1.68E−03<br>0 | 1.85E−04 |

Table 15 shows the parameters and condition values for conditions (1)-(14) in accordance with the fifth embodiment of the invention. It can be seen from Table 15 that the lens assembly 5 of the fifth embodiment satisfies the conditions (1)-(14).

TABLE 15

| | | | | | |
|---|---|---|---|---|---|
| Air1 | 1.02 mm | Air2 | 0.47 mm | Air3 | 0.17 mm |
| CT1 | 0.70 mm | CT2 | 1.45 mm | CT3 | 0.87 mm |
| BFL | 1.94 mm | | | | |
| (R12/R32) × Air3 | 0.55 mm | R32 − (f1 + f3) | −8.37 mm | R21 × (f3/Nd1) | 4.14 $mm^2$ |
| $(R21 \times R22)^{0.5}$/Air3 | 8.90 | (f1 × (f2 + f3))/R21 | 5.26 mm | R12/CT1 | 18.16 |
| (R12 + R21 + R22)/CT3 | 11.05 | f3/(Vd2/Vd3) | −5.07 mm | $(f2/R11)^{0.5}$ | 0.91 |
| f2/(CT3/Air3) | 0.82 mm | (Air1 + Air2)/BFL | 0.76 | (f1 + f2)/f | 2.60 |
| f/Air1 | 4.63 | TTL/(CT2 + Air2) | 3.75 | | |

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:

a first lens which is with refractive power;

a second lens which is with refractive power; and a third lens which is with negative refractive power and comprises a concave surface facing an image side;

wherein the first lens, the second lens, and the third lens are arranged in order from an object side to the image side along an optical axis;

wherein the lens assembly satisfies at least one of following conditions:

$$-12.68\text{ mm} \le R32-(f1+f3) \le -8.16\text{ mm};$$

$$2.247 \le (f1+f2)/f \le 2.99;$$

wherein f is an effective focal length of the lens assembly, f1 is an effective focal length of the first lens, f2 is an effective focal length of the second lens, f3 is an effective focal length of the third lens, and R32 is a radius of curvature of an image side surface of the third lens.

2. The lens assembly as claimed in claim 1, wherein:

the first lens is with positive refractive power; and the second lens is with positive refractive power.

3. The lens assembly as claimed in claim 2, wherein:

the first lens is a meniscus lens and comprises a convex surface facing the object side and a concave surface facing the image side; and the second lens is a meniscus lens and comprises a concave surface facing the object side and a convex surface facing the image side.

4. The lens assembly as claimed in claim 3, wherein the third lens is a meniscus lens and further comprises a convex surface facing the object side.

5. The lens assembly as claimed in claim 4, wherein the lens assembly further comprises an optical filter disposed between the third lens and the image side and satisfies at least one of following conditions:

$$0.2\text{ mm} \le (R12/R32)\times \text{Air }3 \le 14.9\text{ mm};$$

$$3.03\text{ mm}^2 \le R21\times(f3/\text{Nd1}) \le 27.41\text{ mm}^2;$$

$$1.72 \le (R21\times R22)^{0.5}/\text{Air }3 \le 9.25;$$

$$5\text{ mm} \le (f1\times(f2+f3))/R21 \le 32\text{ mm};$$

$$11.01 \le R12/CT1 \le 18.51;$$

$$5 \le (R12+R21+R22)/CT3 \le 14.1;$$

$$-20.64\text{ mm} \le f3/(Vd2/Vd3) \le -1.29\text{ mm};$$

$$0.6 \le (f2/R11)^{0.5} \le 4.2;$$

$$0.58\text{ mm} \le f2/(CT3/\text{Air }3) \le 5.65\text{ mm};$$

$$0.57 \le (\text{Air }1+\text{Air }2)/BFL \le 0.88;$$

$$3.09 \le f/\text{Air }1 \le 4.71;$$

$$3.48 \le TTL/(CT2+\text{Air }2) \le 3.88;$$

wherein f is the effective focal length of the lens assembly, f1 is the effective focal length of the first lens, f2 is the effective focal length of the second lens, f3 is the effective focal length of the third lens, R11 is a radius of curvature of an object side surface of the first lens, R12 is a radius of curvature of an image side surface of the first lens, R21 is a radius of curvature of an object side surface of the second lens, R22 is a radius of curvature of an image side surface of the second lens, R32 is the radius of curvature of the image side surface of the third lens, BFL is an interval from the image side surface of the third lens to an image plane along the optical axis, CT1 is an interval from the object side surface of the first lens to the image side surface of the first lens along the optical axis, CT3 is an interval from an object side surface of the third lens to the image side surface of the third lens along the optical axis, Air1 is an air interval from the image side surface of the first lens to the object side surface of the second lens along the optical axis, Air2 is an air interval from the image side surface of the second lens to the object side surface of the third lens along the optical axis, Air3 is an air interval from the image side surface of the third lens to an object side surface of the optical filter along the optical axis, Vd2 is an Abbe number of the second lens, Vd3 is an Abbe number of the third lens, Nd1 is a refractive index of the first lens, TTL is an interval from an object side surface of a lens closest to the object side to the image plane along the optical axis, and CT2 is an interval from the object side surface of the second lens to the image side surface of the second lens along the optical axis.

6. The lens assembly as claimed in claim 3, further comprising a stop and a fourth lens, wherein the stop is disposed between the object side and the first lens and the fourth lens is with positive refractive power and disposed between the object side and the stop.

7. The lens assembly as claimed in claim 6, wherein the fourth lens is a biconvex lens and comprises a convex surface facing the object side and another convex surface facing the image side.

8. The lens assembly as claimed in claim 7, wherein the lens assembly further comprises an optical filter disposed between the third lens and the image side and satisfies at least one of following conditions:

$$0.2\text{ mm} \le (R12/R32)\times \text{Air }3 \le 14.9\text{ mm};$$

$$3.03\text{ mm}^2 \le R21\times(f3/\text{Nd1}) \le 27.41\text{ mm}^2;$$

$$1.72 \le (R21\times R22)^{0.5}/\text{Air }3 \le 9.25;$$

$$5\text{ mm} \le (f1\times(f2+f3))/R21 \le 32\text{ mm};$$

$$11.01 \le R12/CT1 \le 18.51;$$

$$5 \le (R12+R21+R22)/CT3 \le 14.1;$$

$$-20.64\text{ mm} \le f3/(Vd2/Vd3) \le -1.29\text{ mm};$$

$$0.6 \le (f2/R11)^{0.5} \le 4.2;$$

$$0.58\text{ mm} \le f2/(CT3/\text{Air }3) \le 5.65\text{ mm};$$

$$0.57 \le (\text{Air }1+\text{Air }2)/BFL \le 0.88;$$

$$3.09 \le f/\text{Air }1 \le 4.71;$$

$$3.48 \le TTL/(CT2+\text{Air }2) \le 3.88;$$

wherein f is the effective focal length of the lens assembly, f1 is the effective focal length of the first lens, f2 is the effective focal length of the second lens, f3 is the effective focal length of the third lens, R11 is a radius of curvature of an object side surface of the first lens, R12 is a radius of curvature of an image side surface of the first lens, R21 is a radius of curvature of an object side surface of the second lens, R22 is a radius of curvature of an image side surface of the second lens, R32 is the radius of curvature of the image side surface of the third lens, BFL is an interval from the image side surface of the third lens to an image plane along the optical axis, CT1 is an interval from the object side surface of the first lens to the image side surface of the first lens along the optical axis, CT3 is an interval from an object side surface of the third lens to the image side surface of the third lens along the optical axis, Air1 is an air interval from the image side surface of the first lens to the object side surface of the second lens along the optical axis, Air2 is an air interval from the image side surface of the second lens to the object side surface of the third lens along the optical axis, Air3 is an air interval from the image side surface of the third lens to an object side surface of the optical filter along the optical axis, Vd2 is an Abbe number of the second lens, Vd3 is an Abbe number of the third lens, Nd1 is a refractive index of the first lens, TTL is an interval from an object side surface of a lens closest to the object side to the image plane along the optical axis, and CT2 is an interval from the object side surface of the second lens to the image side surface of the second lens along the optical axis.

9. The lens assembly as claimed in claim 6, wherein the third lens is a biconcave lens and further comprises another concave surface facing the object side.

10. The lens assembly as claimed in claim 9, wherein the lens assembly further comprises an optical filter disposed between the third lens and the image side and satisfies at least one of following conditions:

$$0.2\ \text{mm} \le (R12/R32)\times \text{Air 3} \le 14.9\ \text{mm};$$

$$3.03\ \text{mm}^2 \le R21\times(f3/\text{Nd1}) \le 27.41\ \text{mm}^2;$$

$$1.72 \le (R21\times R22)^{0.5}/\text{Air 3} \le 9.25;$$

$$5\ \text{mm} \le (f1\times(f2+f3))/R21 \le 32\ \text{mm};$$

$$11.01 \le R12/CT1 \le 18.51;$$

$$5 \le (R12+R21+R22)/CT3 \le 14.1;$$

$$-20.64\ \text{mm} \le f3/(Vd2/Vd3) \le -1.29\ \text{mm};$$

$$0.6 \le (f2/R11)^{0.5} \le 4.2;$$

$$0.58\ \text{mm} \le f2/(CT3/\text{Air 3}) \le 5.65\ \text{mm};$$

$$0.57 \le (\text{Air 1}+\text{Air 2})/BFL \le 0.88;$$

$$3.09 \le f/\text{Air 1} \le 4.71;$$

$$3.48 \le TTL/(CT2+\text{Air 2}) \le 3.88;$$

wherein f is the effective focal length of the lens assembly, f1 is the effective focal length of the first lens, f2 is the effective focal length of the second lens, f3 is the effective focal length of the third lens, R11 is a radius of curvature of an object side surface of the first lens, R12 is a radius of curvature of an image side surface of the first lens, R21 is a radius of curvature of an object side surface of the second lens, R22 is a radius of curvature of an image side surface of the second lens, R32 is the radius of curvature of the image side surface of the third lens, BFL is an interval from the image side surface of the third lens to an image plane along the optical axis, CT1 is an interval from the object side surface of the first lens to the image side surface of the first lens along the optical axis, CT3 is an interval from an object side surface of the third lens to the image side surface of the third lens along the optical axis, Air1 is an air interval from the image side surface of the first lens to the object side surface of the second lens along the optical axis, Air2 is an air interval from the image side surface of the second lens to the object side surface of the third lens along the optical axis, Air3 is an air interval from the image side surface of the third lens to an object side surface of the optical filter along the optical axis, Vd2 is an Abbe number of the second lens, Vd3 is an Abbe number of the third lens, Nd1 is a refractive index of the first lens, TTL is an interval from an object side surface of a lens closest to the object side to the image plane along the optical axis, and CT2 is an interval from the object side surface of the second lens to the image side surface of the second lens along the optical axis.

11. The lens assembly as claimed in claim 1, further comprising a stop disposed between the object side and the first lens.

12. The lens assembly as claimed in claim 11, wherein the lens assembly further comprises an optical filter disposed between the third lens and the image side and satisfies at least one of following conditions:

$$0.2\ \text{mm} \le (R12/R32)\times \text{Air 3} \le 14.9\ \text{mm};$$

$$3.03\ \text{mm}^2 \le R21\times(f3/\text{Nd1}) \le 27.41\ \text{mm}^2;$$

$$1.72 \le (R21\times R22)^{0.5}/\text{Air 3} \le 9.25;$$

$$5\ \text{mm} \le (f1\times(f2+f3))/R21 \le 32\ \text{mm};$$

$$11.01 \le R12/CT1 \le 18.51;$$

$$5 \le (R12+R21+R22)/CT3 \le 14.1;$$

$$-20.64\ \text{mm} \le f3/(Vd2/Vd3) \le -1.29\ \text{mm};$$

$$0.6 \le (f2/R11)^{0.5} \le 4.2;$$

$$0.58\ \text{mm} \le f2/(CT3/\text{Air 3}) \le 5.65\ \text{mm};$$

$$0.57 \le (\text{Air 1}+\text{Air 2})/BFL \le 0.88;$$

$$3.09 \le f/\text{Air 1} \le 4.71;$$

$$3.48 \le TTL/(CT2+\text{Air 2}) \le 3.88;$$

wherein f is the effective focal length of the lens assembly, f1 is the effective focal length of the first lens, f2 is the effective focal length of the second lens, f3 is the effective focal length of the third lens, R11 is a radius of curvature of an object side surface of the first lens, R12 is a radius of curvature of an image side surface of the first lens, R21 is a radius of curvature of an object side surface of the second lens, R22 is a radius of curvature of an image side surface of the second lens, R32 is the radius of curvature of the image side surface of the third lens, BFL is an interval from the image side surface of the third lens to an image plane along the optical axis, CT1 is an interval from the object side surface of the first lens to the image side surface of the first lens along the optical axis, CT3 is an interval from an object side surface of the third lens to the image side surface of the third lens along the optical axis, Air1 is an air interval from the image side surface of the first lens to the object side surface of the second lens along the optical axis, Air2 is an air interval from the image side surface of the second lens to the object side surface of the third lens along the optical axis, Air3 is an air interval from the image side surface of the third lens to an object side surface of the optical filter along the optical axis, Vd2 is an Abbe number of the second lens, Vd3 is an Abbe number of the third lens, Nd1 is a refractive index of the first lens, TTL is an interval from an object side surface of a lens closest to the object side to the image plane along the optical axis, and CT2 is an interval from the object side surface of the second lens to the image side surface of the second lens along the optical axis.

13. The lens assembly as claimed in claim 1, wherein the first lens is a spherical lens and made of glass material.

14. The lens assembly as claimed in claim 13, wherein the lens assembly further comprises an optical filter disposed between the third lens and the image side and satisfies at least one of following conditions:

$$0.2\ \text{mm} \le (R12/R32)\times \text{Air }3 \le 14.9\ \text{mm};$$

$$3.03\ \text{mm}^2 \le R21\times(f3/\text{Nd1}) \le 27.41\ \text{mm}^2;$$

$$1.72 \le (R21\times R22)^{0.5}/\text{Air }3 \le 9.25;$$

$$5\ \text{mm} \le (f1\times(f2+f3))/R21 \le 32\ \text{mm};$$

$$11.01 \le R12/CT1 \le 18.51;$$

$$5 \le (R12+R21+R22)/CT3 \le 14.1;$$

$$-20.64\ \text{mm} \le f3/(Vd2/Vd3) \le -1.29\ \text{mm};$$

$$0.6 \le (f2/R11)^{0.5} \le 4.2;$$

$$0.58\ \text{mm} \le f2/(CT3/\text{Air }3) \le 5.65\ \text{mm};$$

$$0.57 \le (\text{Air }1+\text{Air }2)/BFL \le 0.88;$$

$$3.09 \le f/\text{Air }1 \le 4.71;$$

$$3.48 \le TTL/(CT2+\text{Air }2) \le 3.88;$$

wherein f is the effective focal length of the lens assembly, f1 is the effective focal length of the first lens, f2 is the effective focal length of the second lens, f3 is the effective focal length of the third lens, R11 is a radius of curvature of an object side surface of the first lens, R12 is a radius of curvature of an image side surface of the first lens, R21 is a radius of curvature of an object side surface of the second lens, R22 is a radius of curvature of an image side surface of the second lens, R32 is the radius of curvature of the image side surface of the third lens, BFL is an interval from the image side surface of the third lens to an image plane along the optical axis, CT1 is an interval from the object side surface of the first lens to the image side surface of the first lens along the optical axis, CT3 is an interval from an object side surface of the third lens to the image side surface of the third lens along the optical axis, Air1 is an air interval from the image side surface of the first lens to the object side surface of the second lens along the optical axis, Air2 is an air interval from the image side surface of the second lens to the object side surface of the third lens along the optical axis, Air3 is an air interval from the image side surface of the third lens to an object side surface of the optical filter along the optical axis, Vd2 is an Abbe number of the second lens, Vd3 is an Abbe number of the third lens, Nd1 is a refractive index of the first lens, TTL is an interval from an object side surface of a lens closest to the object side to the image plane along the optical axis, and CT2 is an interval from the object side surface of the second lens to the image side surface of the second lens along the optical axis.

15. The lens assembly as claimed in claim 1, wherein the second lens and the third lens are aspheric lenses and made of plastic material.

16. The lens assembly as claimed in claim 15, wherein the lens assembly further comprises an optical filter disposed between the third lens and the image side and satisfies at least one of following conditions:

$$0.2\ \text{mm} \le (R12/R32)\times \text{Air }3 \le 14.9\ \text{mm};$$

$$3.03\ \text{mm}^2 \le R21\times(f3/\text{Nd1}) \le 27.41\ \text{mm}^2;$$

$$1.72 \le (R21\times R22)^{0.5}/\text{Air }3 \le 9.25;$$

$$5\ \text{mm} \le (f1\times(f2+f3))/R21 \le 32\ \text{mm};$$

$$11.01 \le R12/CT1 \le 18.51;$$

$$5 \le (R12+R21+R22)/CT3 \le 14.1;$$

$$-20.64\ \text{mm} \le f3/(Vd2/Vd3) \le -1.29\ \text{mm};$$

$$0.6 \le (f2/R11)^{0.5} \le 4.2;$$

$$0.58\ \text{mm} \le f2/(CT3/\text{Air }3) \le 5.65\ \text{mm};$$

$$0.57 \le (\text{Air }1+\text{Air }2)/BFL \le 0.88;$$

$$3.09 \le f/\text{Air }1 \le 4.71;$$

$$3.48 \le TTL/(CT2+\text{Air }2) \le 3.88;$$

wherein f is the effective focal length of the lens assembly, f1 is the effective focal length of the first lens, f2 is the effective focal length of the second lens, f3 is the effective focal length of the third lens, R11 is a radius of curvature of an object side surface of the first lens, R12 is a radius of curvature of an image side surface of the first lens, R21 is a radius of curvature of an object side surface of the second lens, R22 is a radius of curvature of an image side surface of the second lens, R32 is the radius of curvature of the image side surface of the third lens, BFL is an interval from the image side surface of the third lens to an image plane along the optical axis, CT1 is an interval from the object side surface of the first lens to the image side surface of the first lens along the optical axis, CT3 is an interval from an object side surface of the third lens to the image side surface of the third lens along the optical axis, Air1 is an air interval from the image side surface of the first lens to the object side surface of the second lens along the optical axis, Air2 is an air interval from the image side surface of the second lens to the object side surface of the third lens along the optical axis, Air3 is an air interval from the image side surface of the third lens to an object side surface of the optical filter along the optical axis, Vd2 is an Abbe number of the second lens, Vd3 is an Abbe number of the third lens, Nd1 is a refractive index of the first lens, TTL is an interval from an object side surface of a lens closest to the object side to the image plane along the optical axis, and CT2 is an interval from the object side surface of the second lens to the image side surface of the second lens along the optical axis.

* * * * *